US010713805B2

(12) United States Patent
Chan et al.

(10) Patent No.: US 10,713,805 B2
(45) Date of Patent: Jul. 14, 2020

(54) DEPTH DISCONTINUITY-BASED METHOD FOR EFFICIENT INTRA CODING FOR DEPTH VIDEOS

(71) Applicant: VERSITECH LIMITED, Hong Kong (CN)

(72) Inventors: Shing Chow Chan, Hong Kong (CN); Jia-fei Wu, Jiaxing (CN)

(73) Assignee: VERSITECH LIMITED, Hong Kong (CN)

(*) Notice: Subject to any disclaimer, the term of this patent is extended or adjusted under 35 U.S.C. 154(b) by 0 days.

(21) Appl. No.: 15/748,532

(22) PCT Filed: Aug. 1, 2016

(86) PCT No.: PCT/CN2016/092712
§ 371 (c)(1),
(2) Date: Jan. 29, 2018

(87) PCT Pub. No.: WO2017/020808
PCT Pub. Date: Feb. 9, 2017

(65) Prior Publication Data
US 2018/0218512 A1    Aug. 2, 2018

Related U.S. Application Data

(60) Provisional application No. 62/199,727, filed on Jul. 31, 2015.

(51) Int. Cl.
*H04N 19/122* (2014.01)
*H04N 19/11* (2014.01)
(Continued)

(52) U.S. Cl.
CPC ............. *G06T 7/593* (2017.01); *H04N 19/11* (2014.11); *H04N 19/122* (2014.11);
(Continued)

(58) Field of Classification Search
CPC ................................ G06T 7/593; H04N 19/11
See application file for complete search history.

(56) References Cited

U.S. PATENT DOCUMENTS 2,605,361 A      7/1952   Cutler
10,404,961 B2 *  9/2019   Chan .................... H04N 13/178
(Continued)

FOREIGN PATENT DOCUMENTS

CN   101729891 A     6/2010
CN   102790892   * 11/2012   ............. H04N 13/00
(Continued)

OTHER PUBLICATIONS

International Search Report in corresponding PCT Application No. PCT/CN2016/092712, dated Oct. 20, 2016.
(Continued)

*Primary Examiner* — Irfan Habib
(74) *Attorney, Agent, or Firm* — Leason Ellis LLP

(57) ABSTRACT

A method for encoding depth map image involves dividing the image into blocks. These blocks are then classified into smooth blocks without large depth discontinuities and discontinuous blocks with large depth discontinuities. In the discontinuous blocks, depth discontinuities are represented by line segments and partitions. Interpolation-based intra prediction is used to approximate and compress the depth values in the smooth blocks and partitions. Further compression can be achieved with of depth-aware quantization, adaptive de-blocking filtering, scale adaptive block size, and resolution decimation schemes.

9 Claims, 10 Drawing Sheets

(51) Int. Cl.
| | |
|---|---|
| *H04N 19/82* | (2014.01) |
| *G06T 7/593* | (2017.01) |
| *H04N 19/59* | (2014.01) |
| *H04N 19/136* | (2014.01) |
| *H04N 13/00* | (2018.01) |
| *H04N 13/128* | (2018.01) |
| *H04N 13/161* | (2018.01) |

(52) U.S. Cl.
CPC ........... *H04N 19/136* (2014.11); *H04N 19/59* (2014.11); *H04N 19/82* (2014.11); *H04N 13/128* (2018.05); *H04N 13/161* (2018.05); *H04N 2013/0081* (2013.01)

(56) References Cited

U.S. PATENT DOCUMENTS

| | | | | |
|---|---|---|---|---|
| 2010/0254627 | A1* | 10/2010 | Panahpour Tehrani | ...................... G06T 15/205 382/285 |
| 2011/0304708 | A1* | 12/2011 | Ignatov | ................ H04N 13/128 348/51 |
| 2013/0114695 | A1* | 5/2013 | Joshi | ..................... H04N 19/463 375/240.03 |
| 2013/0222534 | A1* | 8/2013 | Rusanovskyy | ....... H04N 19/597 348/43 |
| 2014/0010295 | A1* | 1/2014 | Lu | ......................... H04N 19/176 375/240.12 |
| 2014/0192154 | A1* | 7/2014 | Jeong | ................... H04N 19/597 348/43 |
| 2014/0247867 | A1* | 9/2014 | Merkle | ................ H04N 19/597 375/240.03 |
| 2017/0289566 | A1* | 10/2017 | He | ......................... H04N 19/52 |

FOREIGN PATENT DOCUMENTS

| | | |
|---|---|---|
| CN | 102790892 A | 11/2012 |
| CN | 104104959 A | 10/2014 |
| EP | 2230856 A2 | 9/2010 |

OTHER PUBLICATIONS

G. J. Sullivan et al, "Overview of the High Efficiency Video Coding (HEVC) Standard," IEEE Trans. Circuits and Systems for Video Technolog , vol. 22, pp.1649-1668, (2012).

J. Lainema et al., "Intra Coding of the HEVC standard," IEEE Trans. Circuits and Systems for Video Technology, vol. 22, pp. 1792-1801, (2012).

R. Keys, "Cubic Convolution Interpolation for Digital Image Processing," IEEE Trans. Acoustics, Speech, and Signal Processing, vol. 29, No. 6, pp. 1153-1160, (1981).

T. Kariya et al., "Generalized Least Squares," J. Wiley, (2004), 12 pages.

J. Canny, "A Computational Approach to Edge Detection," IEEE Trans. Pattern Analysis and Machine Intelligence, vol. 8, No. 6, pp. 679-698, (1986).

A. Hast, "Simple Filter Design for First and Second Order Derivatives by a Double Filtering Approach," Pattern Recognition Letters, vol. 42, No. 1, pp. 65-71, (2014).

M.B. Dillencourt et al., "A General Approach to Connected-component Labeling for Arbitrary Image Representations," J. ACM, vol. 39, No. 2, pp. 253-280, (1992).

Ricardo A. Marinna et al., "Robust Statistics: Theory and Methods," J. Wiley, 2006, ISBN: 0-470-01092-4.

A. Nurunnabi et al., "Robust Statistical Approaches for Local Planar Surface Fitting in 3D Laser Scanning Data," ISPRS J. Photogramm. Remote Sens., vol. 96, pp. 106-122, (2014).

G. A. Ruiz et al., "Efficient canonic signed digit recoding", Microelectronics Journal, No. 42, pp. 1090-1097, (2011).

S. C. Chan et al., "Multiplierless Perfect Reconstruction Modulated Filter Banks with Sum-of-powers-of-two Coefficients," IEEE Signal Processing Letters, vol. 8, pp. 163-166, (2001).

Y. Voronenko et al., "Multiplierless Multiple Constant Multiplication, " ACM Transactions on Algorithms, vol. 3, No. 2, (2007), pp. 1-39.

R.M. Gray, "Source Coding Theory, " Kluwer Academic Publishers, (1990).

H. Kaneko, "A Unified Formulation of Segment Companding Laws and Synthesis of Codecs and Digital Compandors," Bell System Technical Journal, vol. 49, pp. 1555-1558, (Sep. 1970).

R. Finkel, and J. L. Bentley, "Quad Trees: A Data Structure for Retrieval on Composite Keys," Acta. Informatica. vol. 4, No. 1, pp. 1-9, 1974. doi:10.1007/BF00288933.

G. Tech et al., "3D-HEVC draft text 1, " in Proceedings of the 5th Meeting of Joint Collaborative Team on 3D Video Coding Extensions (JCT-3V), Document JCT3V-E1001, Vienna, Austria, (Aug. 2013), 96 pages.

http://en.wikipedia.org/wiki/Bilinear_interpolation. 3 pages.

U. Ramer, "An Iterative Procedure for the Polygonal Approximation of Plane Curves," Computer graphics and image processing, (1972), vol. 1, pp. 244-256.

Robinson et al., "A Short Proof of Cramer's Rule," Mathematics Magazine, (1970), vol. 43, pp. 94-95.

Steven Pigeon, "Huffman Coding," http://www.stevenpigeon.com/Publications/publications/HuffmanChapter.pdf.

\* cited by examiner (a) Filtering samples in the same partition (b) Filtering samples in the different partitions

Fig. 9

DEPTH DISCONTINUITY-BASED METHOD FOR EFFICIENT INTRA CODING FOR DEPTH VIDEOS

CROSS-REFERENCE TO RELATED PATENT APPLICATIONS

This application is a U.S. National Phase Application under 35 U.S.C. § 371 of International Patent Application No. PCT/CN2016/092712, filed Aug. 1, 2016, and claims the benefit of priority under 35 U.S.C. Section 119(e) of U.S. Application Ser. No. 62/199,727, filed Jul. 31, 2015, all of which are incorporated by reference in their entireties. The International Application was published on Feb. 9, 2017 as International Publication No. WO 2017/020808 A1.

FIELD OF THE INVENTION

This invention is concerned with efficient compression and decompression methods for depth maps in intra coding related to the formation, transmission and storage of three dimensional images.

BACKGROUND OF THE INVENTION

Most of the visual content today is still in two dimensional (2D) images or videos which are in form of a sequence of images. Generally, the conventional images and videos do not support changes of viewpoints other than just magnification/scaling or simple shifting. With the advent of stereo or three dimensional display technologies, active shutter and passive polarized eye glasses are now commonly available. More recently, high resolution autostereoscopic displays, which do not require eye glasses, have become available. The input to such autostereoscopic displays is usually i) a video plus a depth map which describes the depth of each pixel in the video or ii) a set of videos at adjacent viewpoints, sometimes called multi-view videos, which are multiplexed on an image frame in a certain format. A lenticular lens or parallax barrier of the autostereoscopic displays perform a spatial filtering so that a user at a certain viewing position will be able to see two different images in his/her left and right eyes, respectively, thus creating a 3D perception.

As noted, depth maps are images (or videos if taken at regular time interval) that record the distances of observable scene points from the optical point of a camera. It provides additional information to the associated color pixels in the color image or video taken at the same position by specifying their depths in the scene. One application of depth maps is to synthesize new views of the scene from the color image or videos (also referred to as texture). Depth maps can also be taken at adjacent spatial locations to form multi-view depth images or videos.

Efficient compression methods for depth map images and videos are therefore important for the efficient storage and transmission of such images. Intra coding plays an important role in hybrid video coding schemes, especially in applications such as effect access, references for prediction, error resilience, bit rate control, low-complexity encoding, etc. See, G. J. Sullivan et al, "Overview of the High Efficiency Video Coding (HEVC) Standard," *IEEE Trans. Circuits and Systems for Video Technology*, vol. 22, pp. 1649-1668, (2012); G. Tech et al., "3D-HEVC draft text 1," in *Proceedings of the 5th Meeting of Joint Collaborative Team on 3D Video Coding Extensions* (JCT-3V), Document JCT3V-E1001, Vienna, Austria, (August 2013); and J. Lainema et al., "Intra Coding of the HEVC standard," *IEEE Trans. Circuits and Systems for Video Technology*, vol. 22, pp. 1792-1801, (2012), all of which are incorporated herein by reference in their entirety. Intra coding is performed relative to information that is contained only within the current frame and not relative to any other frames in the video sequence.

The intra coding of state-of-the-art depth compression algorithms is usually based on spatial sample prediction followed by discrete cosine transform (DCT)-based coding. However, these methods may not be efficient due to the piecewise smooth nature of depth maps. The conventional DCT-based intra coding methods need to use a considerable number of bits to cope with depth discontinuities in depth maps. At high compression ratio, the DCT-based intra coding usually generates artifacts at the discontinuities and degrades the coding quality. Hence, more efficient intra coding for depth compression is in demand.

SUMMARY OF THE INVENTION

As noted the piecewise smooth nature of the depth maps, the conventional coding methods are not efficient for depth coding. The present invention introduces a new concept of depth discontinuity-based representation (DDR) to represent the piecewise smooth nature of depth maps. The discontinuous areas of the depth maps are divided into smooth partitions by representing the discontinuities as segments.

The advantages of this method include: i) flexible error control in approximating the depth discontinuities, ii) possible implementation and integration in conventional block-based codecs, and iii) efficient representation and compression of the relatively smooth partitions as simple smooth functions.

The prior art coding method as disclosed in the Tech article uses piecewise constant values to approximate the smooth areas or partitions; but, it cannot well approximate the small variations of the depth values in them. The interpolation-based intra prediction (IIR) method of the present invention generates an efficient approximation and compression of smooth areas and partitions using bilinear functions. The use of bilinear function can reduce the blocking artifacts of the reconstructed depth maps. Then, a new compression scheme is proposed which utilizes the coefficients of the bilinear functions that enclosed the smooth areas, the partition and the segments which represents the discontinuities.

An efficient method for reconstructing the smooth blocks utilizes a multiplier-less realization of the bilinear interpolation, which significantly reduces the arithmetic complexity and error propagation due to finite word length.

The concept of the Depth Discontinuity-based Representation (DDR) is to represent the piecewise smooth nature of depth maps as smooth blocks or blocks containing large depth discontinuities (discontinuous blocks), possibly with different sizes. Discontinuous blocks are divided into smooth partitions by representing the discontinuities as segments. The advantages of this include: i) flexible error control in approximating the depth discontinuities, ii) possible implementation and integration in conventional block-based codecs, and iii) efficient representation and compression of the relatively smooth partitions as simple smooth functions.

Thus, the invention provides a framework for representing depth discontinuities in the DDR, which includes depth-aware discontinuity detection, discontinuity tracing, discontinuity simplification, and formation of partitions. Further, a new Interpolation-based Intra Prediction (IIR) method is used for efficient approximation and compression of smooth blocks and partitions using bilinear functions. Still further there are provided efficient methods for determining the coefficients of the bilinear function that approximates the partitions, and for reconstructing the smooth blocks using a multiplier-less realization of the bilinear interpolation, which significantly reduces the arithmetic complexity and error propagation due to finite word length.

A new depth-aware adaptive quantization scheme, an adaptive de-blocking filter, a scale adaptive block size, and resolution decimation schemes are used for adapting to different input image resolutions and bit rates, and new methods are provided for coding the prediction residuals.

In summary the invention provides an efficient method for compression and decompression of depth maps in intra coding which involves a novel representation of depth maps and efficient methods for its estimation, compression, and decompression. Further, advantage is taken of the piecewise smooth nature of depth maps through a new DDR and a new IIP technique for efficient compression. The reconstructed depth map has reduced blocking artifacts than using currently available piecewise constant depth approximation. The depth discontinuities are also better preserved. Due to its effectiveness, the approximation errors or prediction residuals are usually small, which leads to significant improvement of efficiency.

BRIEF DESCRIPTION OF THE DRAWINGS

The present invention can be more fully understood by the following detailed description of the preferred embodiments, with reference made to the accompanying drawings, wherein:

FIG. 9 illustrates examples of depth similarity parameter selection according to the DDR

DETAILED DESCRIPTION OF EXEMPLARY EMBODIMENTS OF THE INVENTION

Figure 1A:
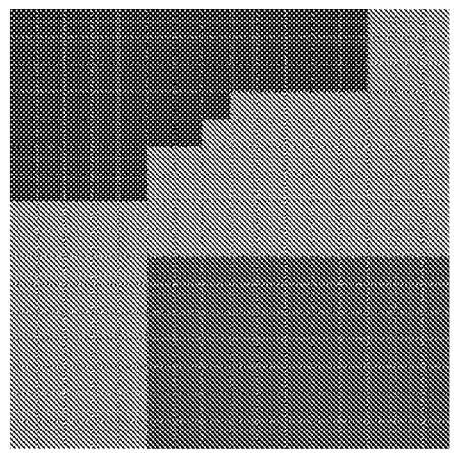
FIG. 1(a) illustrates an enlarged depth map with each pixel shown.
Figure 1B:
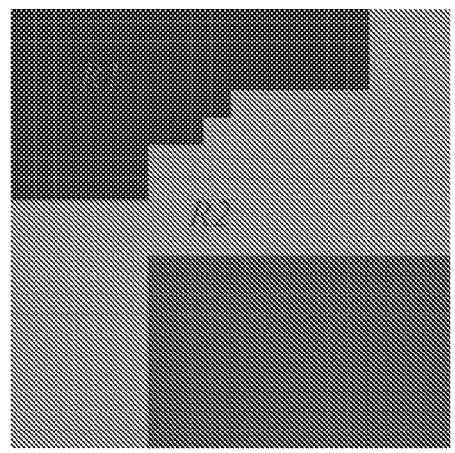
FIG. 1(b) shows a depth map partitioned according depth discontinuities.
Figure 1C:
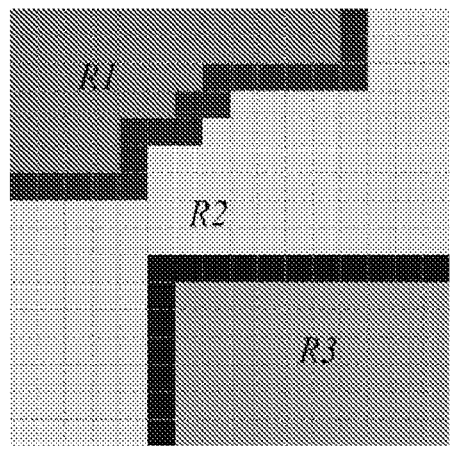
FIG. 1(c) shows a depth discontinuity representation (DDR) with depth discontinuities detected and traced.
Figure 1D:
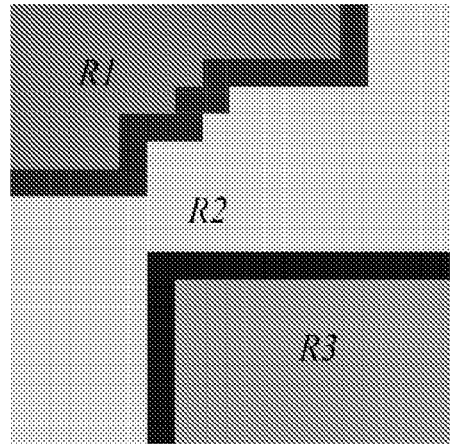
FIG. 1(d) shows a DDR with individual pixel locations omitted.
Figure 1E:
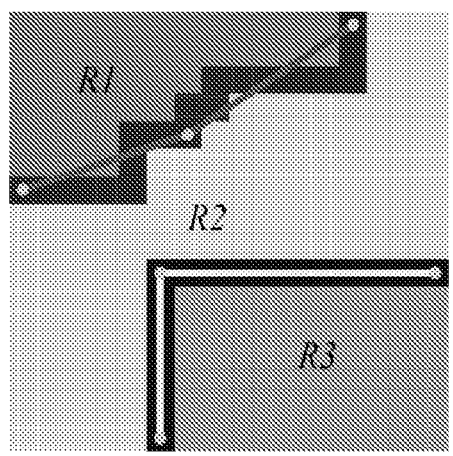
FIG. 1(e) illustrates a simplified DDR with discontinuities and FIG. 1(f) is the same as FIG. 1(e) with location of pixels shown.
Figure 1F:
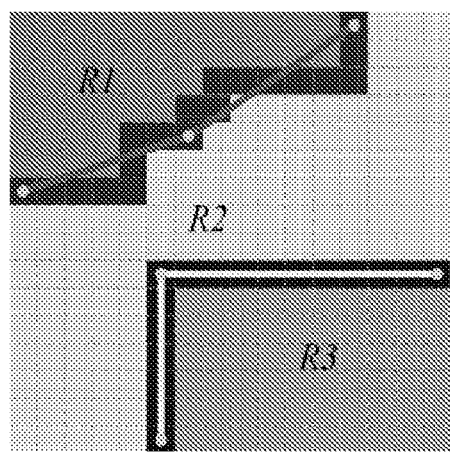

The present invention provides a new concept, called depth discontinuity-based representation (DDR), to represent the discontinuous and smooth nature of the depth maps. The proposed DDR represents the depth map as a set of discontinuities, from which a partition of the depth map into mostly smooth regions can be obtained. To obtain the DDR for block-based coding, the image will be divided into blocks, possibly with different sizes, which will be classified into smooth blocks or blocks containing large depth discontinuities (discontinuous blocks). FIG. 1 illustrates the DDR of a discontinuous block where depth discontinuities are represented by line segments and several smooth partitions.

The state-of-the-art intra coding method in the Tech article uses a variety of discrete directions to model the depth discontinuities. But this method cannot preserve the depth discontinuities well, so that it may require a considerable number of bits to encode them. The present invention uses segments or curves to represent the depth discontinuities which can improve the accuracy of representation. Moreover, the accuracy of representing the depth discontinuities can be controlled by the selection of segments to represent the depth discontinuities.

The present invention also uses an efficient interpolation-based intra prediction (IIR) method to approximate and compress the depth values in smooth blocks and partitions. The state-of-the-art intra coding method of Tech uses piecewise constant values to approximate the smooth areas and partitions. However, it cannot preserve the small variations of the depth values in the smooth areas and partitions. To further reduce the approximation error, smooth functions, such as bilinear function or bicubic function, are adopted to approximate the depth values in smooth areas and partitions. See, https://en.wikipedia.org/siki/Bilinear_interpo; https://en.wikipedia.org/wiki/Bilinear_interpolation and R. Keys, "Cubic Convolution Interpolation for Digital Image Processing," *IEEE Trans. Acoustics, Speech, and Signal Processing*, vol. 29, no. 6, pp. 1153-1160, (1981), which are incorporated herein by reference in their entirety. In particular, the bilinear function is employed because it requires fewer function coefficients to be encoded and the performance is satisfactory.

At the encoder side, an efficient method is proposed to determine the function coefficients of the bilinear functions for approximating the partitions. For real-time implementation, computing the optimal least square (LS) solution of the bilinear function can be quite demanding. See T. Kariya et al., "Generalized Least Squares," J. Wiley, (2004), which is incorporated herein by reference in its entirety. Here, we proposed an efficient method which aims to simplify this process at the expense of slightly degraded fitting performance. The basic idea is to approximate the partition as a plane instead of a bilinear function. This may increase the approximation, but on the other hand it will potentially reduce the bits for coding the function coefficients of the bilinear function.

Depth Discontinuity-Based Representation (DDR)

A new compression scheme is proposed for the DDR, including: line segments for representing the depth discontinuities and function coefficients for approximating the depth values inside the smooth blocks and partitions.

At the decoder side, an efficient multiplier-less realization of the bilinear interpolation is designed for the smooth blocks and partitions reconstruction. The bilinear interpolation is adopted to reconstruct the depth values inside the smooth blocks and partitions. But its arithmetic complexity is considerable for real-time implementation. And any coding error will be propagated due to the finite word length of the function coefficients. To cope with these problems, an efficient multiplier-less realization of the bilinear interpolation is proposed to reduce the arithmetic complexity and error propagation due to finite word length.

Moreover, a new depth-aware quantization scheme, a scale adaptive block size, a resolution decimation scheme, and residual quantization are proposed for controlling the bit rate adapting to different input depth map resolution.

Thus, the basic elements of the proposed intra coding include:
1. The concept of the Depth Discontinuity-based Representation (DDR) to represent the piecewise smooth nature of depth maps and the framework for representing depth discontinuities in the DDR.
2. A new Interpolation-based Intra Prediction (IIR) method for efficient approximation and compression of smooth blocks and partitions using bilinear functions
3. An efficient method for determining the coefficients of the bilinear function approximation to the partitions.
4. A new compression scheme of the DDR.
5. An efficient method for reconstructing the smooth blocks and partitions using a multiplier-less realization of the bilinear interpolation.
6. A new depth-aware quantization scheme, an adaptive de-blocking filter, a scale adaptive block size, and a resolution decimation scheme for adapting to different input image resolution and bit rate.

As mentioned, the proposed depth discontinuity-based representation (DDR) represents the depth map as a set of discontinuities, from which a partition of the depth map into mostly smooth regions can be obtained. To obtain the DDR for block-based coding, the image is divided into blocks, possibly with different sizes, which will be classified into smooth blocks or blocks containing large depth discontinuities (discontinuous blocks). The discontinuous blocks can be represented by depth discontinuities and several smooth partitions as shown in FIG. 1.

Figure 2:
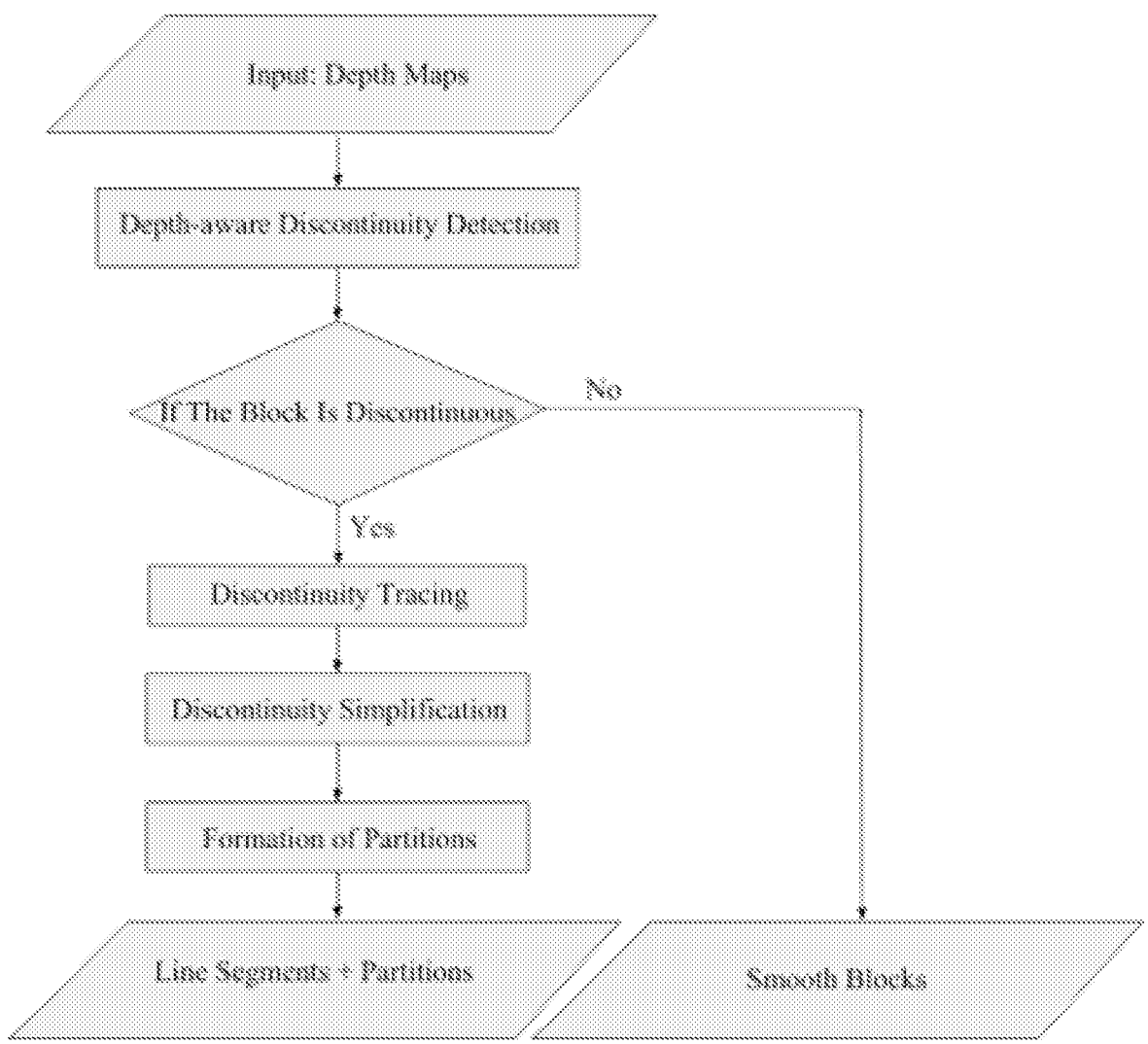
FIG. 2. is a process flow chart showing how depth discontinuities are represented in the DDR.

FIG. 2 shows the major steps in generating the Depth Discontinuity-based Representation (DDR) of depth maps for block-based coding. A depth-aware discontinuities detection is performed where important depth discontinuities are detected and selected for further coding by using both the magnitude and gradient information of the depth map.

In block-based codec, each of the blocks is classified as discontinuous or smooth depending on whether selected depth discontinuities are found in the current block or not. The binary discontinuity map is traced inside each discontinuous block so that the partitions can be formed by the resulting line segments traced inside each block and be approximated by smooth functions. The traced binary discontinuity map inside each discontinuous block is then approximated by straight line segments with a controllable maximum error from the original discontinuity map. This allows further coding of the straight line segments by separating the end points and turning points inside each discontinuous block.

The outputs of the DDR are i) a set of smooth blocks for approximation and ii) a set of discontinuous blocks each with simplified straight line segments and a unique partition, which can be obtained from the straight line segments. Each partition of pixels can then be approximated by smooth functions for further compression/prediction.

The conventional edge detection methods, such as Canny and Sobel, can be used for discontinuities detection of depth maps. See, J. Canny, "A Computational Approach to Edge Detection," *IEEE Trans. Pattern Analysis and Machine Intelligence*, vol. 8, no. 6, pp. 679-698, (1986); and A. Hast, "Simple Filter Design for First and Second Order Derivatives by A Double Filtering Approach," *Pattern Recognition Letters*, vol. 42, no. 1, pp. 65-71, (2014), both of which are incorporated herein by reference in their entirety. However, the conventional edge detection methods only use the depth gradient and gradient threshold method to determine the number of detected discontinuities. This is not reliable for depth images because the discontinuities with large depth values and small gradient are usually considered more significant than the ones with small depth values and large gradient. Hence, both of the depth gradient and depth values are used to adjust the number of the depth discontinuities. In the proposed depth discontinuity detection method, gradient threshold and depth threshold detection will work together to control the depth discontinuities. Using this method, the number of discontinuities can be gradually adjusted to match the bit rate requirement.

Discontinuity Tracing

Figure 3:
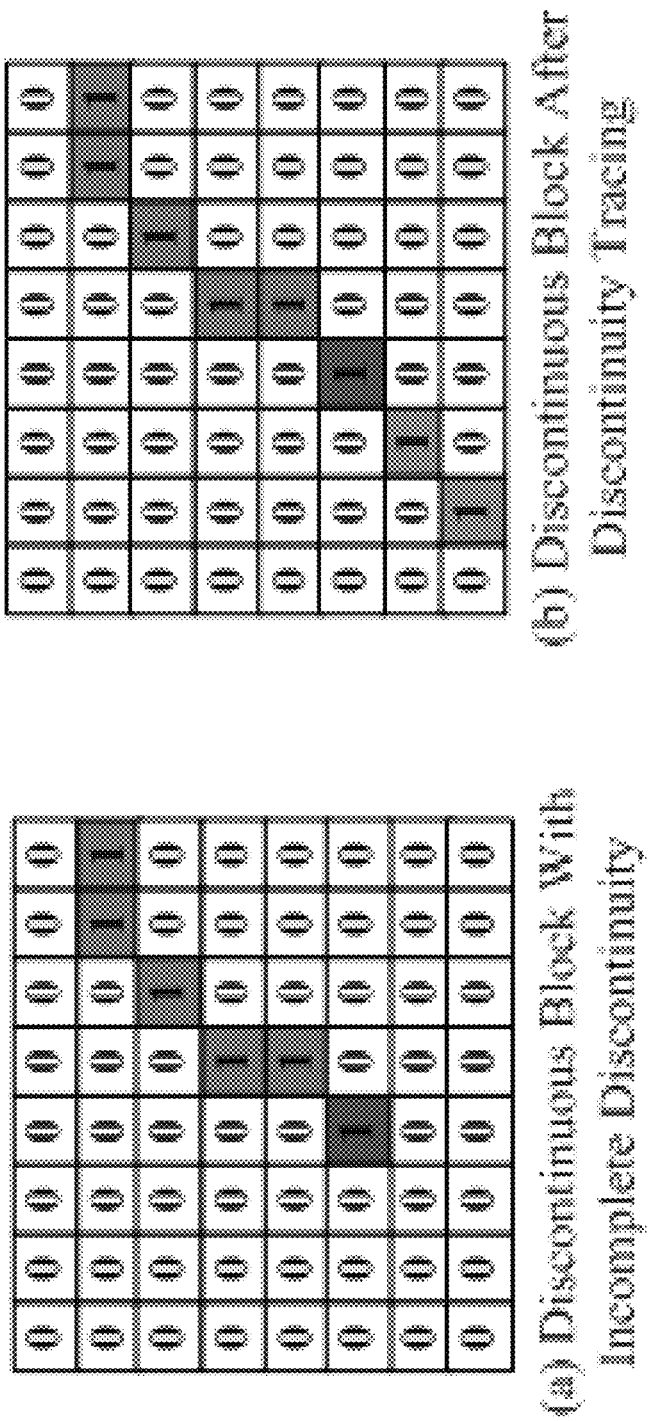
FIG. 3. illustrates the extending of incomplete discontinuity in blocks.

The purpose of discontinuity tracing is to trace each depth discontinuity in a block so that a unique partition can be formed for approximation by smooth functions. If the discontinuities disappear inside the block as shown in FIG. 3(a), the block cannot be divided into partitions directly. Hence, during discontinuity tracing, discontinuities which disappear inside the block, called "incomplete discontinuities," will be extended to the boundary of the block. For example, the incomplete discontinuity of the block in FIG. 3(a) is extended to the bottom boundary in FIG. 3(b). After discontinuity simplification, these discontinuities will be approximated by line segments so that they can be specified by their end points and turning points.

The implementation of the discontinuity tracing, which includes the following two steps:
1. Incomplete discontinuities are detected by checking whether there are endpoints located inside the block other than on boundaries of the block. If so, they are extend to the block boundaries.
2. Extend the incomplete discontinuities until they arrive at the block boundaries or cross another discontinuity. This extension direction is decided by the gradient of its nearest discontinuities.

The discontinuities after performing edge detection of the depth map are described as a binary image. The tracing step further helps to divide the block into partitions for further coding.

The discontinuities so obtained can be compressed using binary image compression technique such as context-based arithmetic coding. However, it lacks the flexibility of achieving a higher compression ratio in exchange for an increased distortion. Therefore, discontinuity simplification is required, which can lead to a higher compression ratio.

The depth discontinuities can in general be represented as curves, such as splines. However, line segments are more attractive in terms of parameter coding, finite word length computation, and simplicity in determining partitions. Some of these are essential to a low complexity decoder. Therefore, a framework using straight line segments is preferred.

First of all, the binary line segments inside a block are approximated by straight line segments, which are represented by their endpoints and turning points. The approximation or simplification of a binary line segment by straight line segments or polygons can be obtained by a number of algorithms such as the Ramer-Douglas-Peucker (RDP) algorithm. See, U. Ramer, "An Iterative Procedure for the Polygonal Approximation of Plane Curves," *Computer graphics and image processing*, vol. 1, pp. 244-256, (1972), which is incorporated herein by reference in its entirety. The approximation accuracy, usually in terms of the maximum distance from the straight line segments can be controlled in such as process. By varying this maximum distance, the binary line segments can be approximated to different accuracy. Generally, simpler straight line segments with few turning points have lower approximating power and hence a larger maximum distance in the approximation, but they will lead to a smaller size and hence higher compression ratio as fewer turning points need to be coded.

Figure 4:
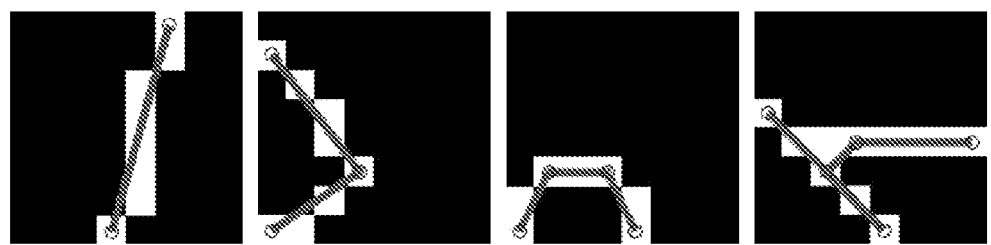
FIG. 4 provides examples of discontinuity simplification.

After discontinuity simplification, any discontinuity in the block can be represented by a set of line segments, which is illustrated in FIG. 4. There is a tradeoff between the accuracy of the discontinuity representation and the bit rate. More line segments can improve the accuracy of the discontinuity representation, but more bits will be used for coding the feature points of the additional lines. Hence, the bit rate can be roughly control by adjusting the number of line segments.

Formation of Partitions

Once the discontinuity tracing and discontinuity simplification is completed, a unique partitioning of the discontinuous blocks can be performed to identify the pixels inside each partition for further approximation.

Since the blocks have been partitioned into different regions by the traced discontinuities, the pixels belonging to the same region can be grouped together to form a partition using the connected component labeling (CCL) algorithm as in M. B. Dillencourt et al., "A General Approach to Connected-component Labeling for Arbitrary Image Representations," *J. ACM*, vol. 39, no. 2, pp. 253-280, (1992), which is incorporated herein by reference in its entirety. Moreover, each partition will be assigned a unique label to facilitate the subsequent approximation of the smooth pixels inside by functions such as the bilinear function.

In the encoder, the straight line segments and the quantized parameters of the approximating functions will be coded and packed in a certain format. The difference between the approximation function and the original pixels inside the partition gives the pixel errors in the partition. If necessary, they may be coded by waveform coding techniques such as DCT-based methods etc. However, a new method for exploring the nature of the approximation errors called "adaptive companding quantization" is preferred.

After transmission or storage, the encoded data and the images can be recovered in a decoder. In the decoder, the straight line segments can be recovered and the partitions are recovered by the above process. After decoding the quantized parameters of the approximating functions, an approximation to the smooth partitions is reconstructed.

As mentioned, the depth values inside each partition usually have much smaller variations, so they can be approximated by simpler functions. The process is referred to as "interpolation-based intra prediction" (IIP), which provides an efficient intra prediction of the pixels inside the partitions. It differs from conventional intra prediction in block based codecs as the support of the partition can be arbitrarily shaped, and a higher order approximation function is used rather than the constant function disclosed in the Lainema article.

Interpolation-Based Intra Prediction (IIP)

The basic concept of interpolation-based intra prediction (IIP) is to employ simple yet versatile approximation functions with few parameters to serve as an efficient predictor or approximation to the smooth depth blocks and partitions. It is found in experiments that the approximation errors are usually small enough to be ignored and hence it is often unnecessary to code the residuals. Compared with DCT-based coding, fewer coefficients are required and hence the overhead to specify the non-zero coefficients are largely reduced. Moreover, by predicting the function parameters from adjacent coded blocks, these parameters can be efficiently compressed leading to a high compression ratio. The bilinear function is preferred because of the following advantages 1) The bilinear function can be parameterized by four function coefficients at the corners of a rectangular grid.
2) It usually provides good and smooth approximation to depth values inside the block.
3) By coding the function coefficients, an approximation of the depth values in the current block can be obtained at the decoder side. Moreover, these coefficients can be predicted from nearby coded blocks.
4) Efficient structure for reconstructing the function values from these four coefficients can be derived, which does not require any multiplications (a.k.a multiplier-less implementation).

For a smooth block, all the depth values d(x,y) inside the block are approximated by a bilinear function. The bilinear approximation is performed in a rectangular integer grid $(x,y) \in [0, N] \times [0, N]$. The current block needs to be approximated is located in the integer grid $(x,y) \in [1, N] \times [1, N]$ where x and y are respectively the horizontal and vertical coordinates and N×N is the block size. For simplicity, the approximated values of the bilinear function $f(x,y)$ at $(x,y)$ are assumed to be given by the following formula, $$f(x, y) = f(0, 0)\frac{x}{N}\frac{y}{N} + f(N, 0)\left(1 - \frac{x}{N}\right)\frac{y}{N} + \qquad (1)$$
$$f(0, N)\frac{x}{N}\left(1 - \frac{y}{N}\right) + f(N, N)\left(1 - \frac{x}{N}\right)\left(1 - \frac{y}{N}\right),$$

where $f(0,0)$, $f(N,0)$, $f(0, N)$, and $f(N,N)$ are the function coefficients of the bilinear function on the enclosing corners.

For each partition of the discontinuous block, the depth values d(x,y) to be coded lie inside an arbitrary partition. Since the partition is uniquely defined from the discontinuities and the method for generating the partition, the pixel locations are known. These locations are parts of a rectangular grid and hence their depth values can be approximated by a bilinear function, which can be specified through the values at the corners of the grid. From the coefficients of an appropriately chosen bilinear function and the partition, one can compute the approximation or prediction the depth values inside the partition.

To define the rectangular grid, a rectangular bounding box can be used to cover all or most pixels in the partition. Let the size of the bounding box be $N_1 \times N_2$. The depth values inside will be approximated by the bilinear function as $$f(x, y) = f(0, 0)\frac{x}{N_1}\frac{y}{N_2} + f(N_1, 0)\left(1 - \frac{x}{N_1}\right)\frac{y}{N_2} + \qquad (2)$$
$$f(0, N_2)\frac{x}{N_1}\left(1 - \frac{y}{N_2}\right) + f(N_1, N_2)\left(1 - \frac{x}{N_1}\right)\left(1 - \frac{y}{N_2}\right)$$

where $f(0,0)$, $f(N_1,0)$, $f(0,N_2)$ and $f(N_1,N_2)$ are the function coefficients of the bilinear function on the enclosing corners of the rectangular bounding box.

Efficient Estimation of Function Coefficients

Generally, the coefficients or parameters of a functional approximation to a set of data points can be achieved by minimizing certain measures of the fitting or approximation errors. Useful error measures include the least squares criterion, least absolute criterion, robust statistical-based criterion and variations of them. See, Ricardo A. Marinna et al., "Robust Statistics: Theory and Methods," J. Wiley, 2006.

Depth images, especially from depth cameras, are frequently very noisy and robust statistical-based criterion should be used generally.

If the depth images are preprocessed to remove possible outliers, then a least square fitting as in the Kariya article can also be used to estimate the four function coefficients located on the corners. For smooth blocks, the three function coefficients located on the left-top, right-top and left-bottom corners can be estimated from neighboring coded blocks and only one function coefficient needs to be derived from the least square (LS) solution. For discontinuous blocks, all or some of the function coefficients of different partitions may need to be estimated by the LS solution. Their values may be correlated with values in nearby coded blocks and hence they can also be predicted from previously coded information.

Generally, the fitting problem can be written as the minimization of the following cost function with respect to coefficients $$E = \sum_{(x_p, y_p) \in P} \rho(d(x_p, y_p) - x_p^T \beta) \quad (3)$$

where $f(x_p, y_p) = x_p^T \beta$ is the bilinear function, $d(x_p, y_p)$ is the depth values at location $(x_p, y_p)$, $\rho(e)$ is error measure and P denotes the set of locations inside the partition. For LS fitting, $\rho(e) = e^2$. On the other hand, $\rho(e)$ can be chosen as the M-estimate function, which is more robust to outliers in $d(x_p, y_p)$. See the Marinna article. Let $\beta = [f_{00}, f_{01}, f_{10}, f_{11}]^T$ and $x_p = [x_{00,p}, x_{01,p}, x_{10,p}, x_{11,p}]^T$ the LS solution of $\beta$ can be written as, $$\beta = R_{xx}^{-1} r_{xd} \quad (4)$$

where $R_{xx} = \sum_{(x_p, y_p) \in P} x_p x_p^T$ and $r_{xd} = \sum_{(x_p, y_p) \in P} x_p d(x_p, y_p)$.

In cases where some of the function coefficients can be estimated from neighboring blocks, their corresponding values in $\beta$ will be replaced by these estimated values. Let $\beta$ be partitioned as $\beta = [\hat{\beta}^T, \tilde{\beta}^T]^T$ where $\hat{\beta}$ is the estimated corner values while $\tilde{\beta}$ is the reduced variable vector to be determined. Assume that $x_p$ is to be partitioned in the same order as $\beta$ $x_P = [\hat{x}_p^T, \tilde{x}_p^T]^T$ the LS problem becomes, $$E = \sum_{(x_p, y_p) \in P} [\tilde{d}(x_p, y_p) - \tilde{x}_p^T \tilde{\beta}]^2 \text{ where} \quad (5)$$

$\tilde{d}(x_p, y_p) = d(x_p, y_p) - \hat{x}_p^T \hat{\beta}$. The solution is $$\tilde{\beta} = R_{\tilde{x}\tilde{x}}^{-1} r_{\tilde{x}d} \text{ where} \quad (6)$$

$R_{\tilde{x}\tilde{x}} = \sum_{(x_p, y_p) \in P} \tilde{x}_p \tilde{x}_p^T$ and $r_{\tilde{x}d} = \sum_{(x_p, y_p) \in P} \tilde{x}_p \tilde{d}(x_p, y_p)$.

The solution of the problem in the Lainema article for M-estimate and other functions can be obtained by well-established techniques. One frequently used method is called "iterative reweighted least squares," where $\rho(e)$ is locally approximated by the square function so that it can be solved iteratively as a LS problem. Different weightings can be given to pixels at different locations. For example, smaller weighting can be given to pixels around depth discontinuities as they may appear as outliers due to discontinuities simplification.

For real-time implementation, computing the optimal LS solution of the bilinear function can be quite demanding. A new method is proposed which aims to simplify this process at the expense of slightly degraded fitting performance. The basic idea is to approximate the partition as a plane instead of a bilinear function. This may increase the approximation error but on the other hand it will potentially reduce the bits for coding the coefficients of the bilinear function and the implementation complexity.

Since three points are sufficient to determine a plane without fitting, the three representative data points are determined from the available data points in order to define the fitting plane. This is similar to robust plane fitting; but, the number of possible candidates is usually small. See A. Nurunnabi et al., "Robust Statistical Approaches for Local Planar Surface Fitting in 3D Laser Scanning Data," *ISPRS J. Photogramm. Remote Sens.*, vol. 96, pp. 106-122, (2014), which is incorporated herein by reference in its entirety. Given the set of corners or vertices of the partition, one aims to select set of three representative corners so that one of the resulting planes will best fit all the data points.

In order to accomplish this task first the representative corners are selected and then their associated fitting error is evaluated. By picking the one with the smallest fitting error, the desired plane is identified. Finally, the plane is evaluated on the four corners of the bilinear function to obtain the four required coefficients for further coding. Since the depth values around the potential vertices or corners needs to be estimated, there should be sufficient data points around a potential candidate. The corners can be picked with the decreasing inception angle (measured by the number of pixels for a given window size). Then combinations based on the first k candidates are considered. By estimating the depth values, the fitting error for the whole partition can be evaluated. The one with the lowest fitting error is chosen. By coding the three most representative points selected from the k candidates, the approximated depth values inside can be obtained readily through bilinear interpolation.

The novel method to determine the candidate plane and its fitting error is implemented mainly using additions. If the plane is described by an equation of the form $ax+by+cz+d=0$, it is solved by the following system of equations:

$$ax_1+by_1+cz_1+d=0,$$

$$ax_2+by_2+cz_2+d=0,$$

$$ax_3+by_3+cz_3+d=0. \quad (7)$$

This system of equations can be solved using Cramer's Rule and basic matrix manipulations. See, Robinson et al., "A Short Proof of Cramer's Rule," *Mathematics Magazine*, vol. 43, pp. 94-95, (1970), which is incorporated herein by reference in its entirety. Let $$D = \begin{vmatrix} x_1 & y_1 & z_1 \\ x_2 & y_2 & z_2 \\ x_3 & y_3 & z_3 \end{vmatrix}. \quad (8)$$

If D is non-zero (so for planes that do not pass through the origin) the values for a, b and c can be calculated as follows:

$$a = \frac{-d}{D}\begin{vmatrix} 1 & y_1 & z_1 \\ 1 & y_2 & z_2 \\ 1 & y_3 & z_3 \end{vmatrix} \quad (9)$$

$$b = \frac{-d}{D}\begin{vmatrix} x_1 & 1 & z_1 \\ x_2 & 1 & z_2 \\ x_3 & 1 & z_3 \end{vmatrix} \quad (10)$$

$$c = \frac{-d}{D}\begin{vmatrix} x_1 & y_1 & 1 \\ x_2 & y_2 & 1 \\ x_3 & y_3 & 1 \end{vmatrix} \quad (11)$$

$$\text{where } |A| = \begin{vmatrix} a & b & c \\ d & e & f \\ g & h & i \end{vmatrix} = a\begin{vmatrix} e & f \\ h & i \end{vmatrix} - b\begin{vmatrix} d & f \\ g & i \end{vmatrix} + c\begin{vmatrix} d & e \\ g & h \end{vmatrix} \quad (12)$$

is the 3×3 determinant of matrix $$A = \begin{bmatrix} a & b & c \\ d & e & f \\ g & h & i \end{bmatrix}$$

and d can take on any nonzero values.

Using equation (12), the above equation can be rewritten as $$a = \quad (13)$$

$$\frac{-d}{D}\begin{vmatrix} 1 & y_1 & z_1 \\ 1 & y_2 & z_2 \\ 1 & y_3 & z_3 \end{vmatrix} = \frac{d}{D}\left\{z_1\begin{vmatrix} y_2 & 1 \\ y_3 & 1 \end{vmatrix} - z_2\begin{vmatrix} y_1 & 1 \\ y_3 & 1 \end{vmatrix} + z_3\begin{vmatrix} y_1 & 1 \\ y_2 & 1 \end{vmatrix}\right\}$$

$$b = \quad (14)$$

$$\frac{-d}{D}\begin{vmatrix} x_1 & 1 & z_1 \\ x_2 & 1 & z_2 \\ x_3 & 1 & z_3 \end{vmatrix} = \frac{d}{D}\left\{z_1\begin{vmatrix} 1 & x_2 \\ 1 & x_3 \end{vmatrix} - z_2\begin{vmatrix} 1 & x_1 \\ 1 & x_3 \end{vmatrix} + z_3\begin{vmatrix} 1 & x_1 \\ 1 & x_2 \end{vmatrix}\right\}$$

$$c = \frac{-d}{D}\begin{vmatrix} x_1 & y_1 & 1 \\ x_2 & y_2 & 1 \\ x_3 & y_3 & 1 \end{vmatrix} = \frac{d}{D}\left\{\begin{vmatrix} y_2 & x_2 \\ y_3 & x_3 \end{vmatrix} - \begin{vmatrix} y_1 & x_1 \\ y_3 & x_3 \end{vmatrix} + \begin{vmatrix} y_1 & x_1 \\ y_2 & x_2 \end{vmatrix}\right\} \quad (15)$$

$$D = \left\{z_1\begin{vmatrix} x_2 & y_2 \\ x_3 & y_3 \end{vmatrix} - z_2\begin{vmatrix} x_1 & y_1 \\ x_3 & y_3 \end{vmatrix} + z_3\begin{vmatrix} x_1 & y_1 \\ x_2 & y_2 \end{vmatrix}\right\} \quad (16)$$

Since $x_1, x_2, x_3$ and $y_1, y_2, y_3$ are predefined numbers from 0 to $N_1-1$ and 0 to $N_2-1$, respectively, their sums $x_1-x_i$ and $y_1-y_j$ can be stored as canonical signed digits (CSD) [14] and hence the multiplication with $z_i$ can be implemented as additions. See, G. A. Ruiz et al., "Efficient canonic signed digit recoding", *Microelectronics Journal*, no. 42, pp. 1090-1097, (2011), which is incorporated herein by reference in its entirety. The products $x_i y_j$ can be precomputed (as CSD and binaries) to simplify the computation of c above. The term d=D can be picked to simplify the representation. To evaluate the coefficients of the bilinear function, the value of z at locations, (0,0), $(N_1,0)$, $(0,N_2)$ and $(N_1,N_2)$ is evaluated using the formula $$z = -\frac{(D + ax + by)}{c} \quad (17)$$

This involves division of (D+ax+by) by c. Once the bilinear function is obtained, the depth values can be evaluated at all points of the partition using the multiplier-less bilinear interpolator to be described below, and the fitting error can be obtained. Then the performance of different combinations of k candidates can be evaluated.

Multiplier-less Realization of Bilinear Interpolation

An efficient multiplier-less realization of bilinear interpolation for reconstructing the smooth blocks and partitions uses the function coefficients of the bilinear function. The problem is to compute the depth values of $\hat{d}(x,y)$ from the estimated function coefficients $\hat{f}(0,0)$, $\hat{f}(1,0)$, $\hat{f}(0,1)$, and $\hat{f}(1,1)$ as $$\hat{d}(x, y) = \hat{f}(0, 0)\frac{x}{N}\frac{y}{N} + \hat{f}(N, 0)\left(1 - \frac{x}{N}\right)\frac{y}{N} + \quad (18)$$
$$\hat{f}(0, N)\frac{x}{N}\left(1 - \frac{y}{N}\right) + \hat{f}(N, N)\left(1 - \frac{x}{N}\right)\left(1 - \frac{y}{N}\right).$$

Since the normalized products $$\left(1 - \frac{x}{N}\right)\left(1 - \frac{y}{N}\right), \frac{y}{N}\left(1 - \frac{x}{N}\right), \frac{x}{N}\left(1 - \frac{y}{N}\right), \text{ and } \frac{x}{N} \cdot \frac{y}{N},$$

where $(x,y) \in [1,N] \times [1,N]$ can be precomputed if N is determined, each of these products can be written in canonical signed digits (CSD) or Sum-of-Powers-of-Two (SOPOT) [15] in the form, $$\sum_{l \in \{1,2,34\}} p_l 2^{-l}, \text{ where } p_l \in \{0, \pm 1\}. \quad (19)$$

See, S. C. Chan et al., "Multiplierless Perfect Reconstruction Modulated Filter Banks with Sum-of-powers-of-two Coefficients," *IEEE Signal Processing Letters*, vol. 8, pp. 163-166, (2001), which is incorporated herein by reference in its entirety.

Consequently, the multiplication of a variable u with $$\left(1 - \frac{x}{N}\right)\left(1 - \frac{y}{N}\right), \frac{y}{N}\left(1 - \frac{x}{N}\right), \frac{x}{N}\left(1 - \frac{y}{N}\right), \frac{x}{N} \cdot \frac{y}{N}$$

can be implemented as $$u\sum_{l \in \{1,2,34\}} p_l 2^{-l} = \sum_{l \in \{1,2,34\}} p_l(u \times 2^{-l}), \quad (20)$$

which amounts to shifting u by $2^{-l}$ for each nonzero $p_l$ and adding them together. Thus, the bilinear interpolation can be implemented using additions only.

Now the bilinear interpolation can be placed in 8×8 blocks for example. The precomputed coefficients of products $$\left(1 - \frac{x}{N}\right)\left(1 - \frac{y}{N}\right), \frac{y}{N}\left(1 - \frac{x}{N}\right), \frac{x}{N}\left(1 - \frac{y}{N}\right), \frac{x}{N} \cdot \frac{y}{N},$$

where N=8 and (x,y)∈[1,N]×[1,N], are summarized in Table 1 to Table 4 below. Due to the relationship of the elements in tables, totally there are only 31 unique constant coefficients as summarized in Table 5 and they can be written as SOPOT coefficients as shown in Table 6. Multiplications with these SOPOT coefficients can be implemented by only additions and shifts only and only a 6 bit word length is needed to represent these precomputed coefficients for the current situation.

Figure 5:
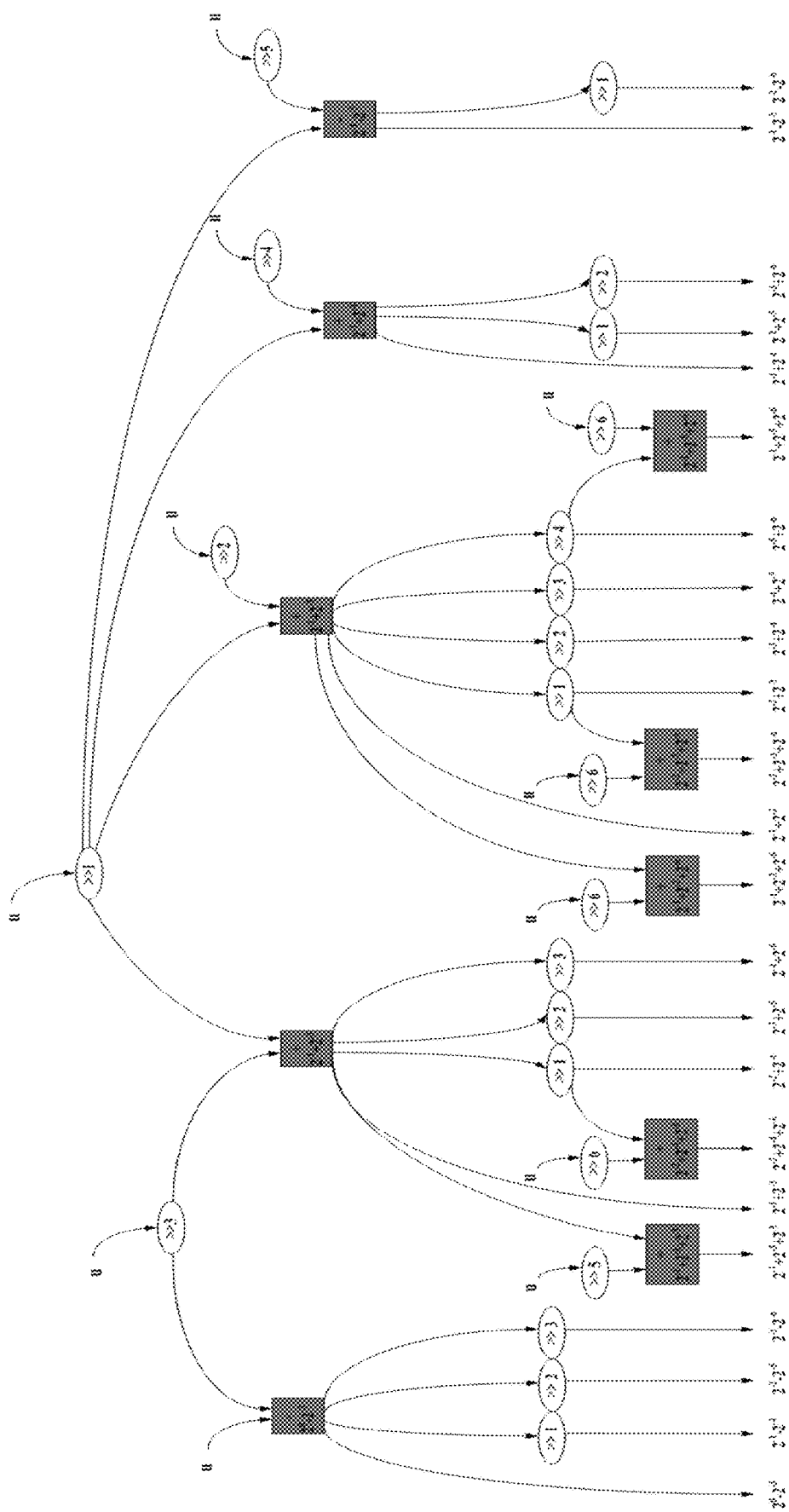
FIG. 5 shows an optimized Multiplier Block for Multiplier-less Bilinear Interpolation for an (8×8) Block.

Furthermore, the multiplication of a variable u with a set of precomputed or fixed constants can be efficiently realized by the multiple constant multiplication (MCM) technique, which implements simultaneously the multiplications with the least number of adders and shifts by means of an optimized multiplier block. See Y. Voronenko et al., "Multiplierless Multiple Constant Multiplication," *ACM Transactions on Algorithms*, vol. 3, no. 2, (2007), which is incorporated herein by reference in its entirety. After determining the optimized multiplier block, only 10 adders/subtractors are needed to implement the required partial sum in multiplier-less bilinear interpolation. The optimized multiplier block designed is shown in FIG. 5, where the shaded blocks represent the adders/subtractors and '>>n' means shift right by n bits.

TABLE 1

Precomputed Coefficients of Term $\left(1 - \frac{x}{N}\right)\left(1 - \frac{y}{N}\right)$ in an (8×8) Block

| y | x=1 | 2 | 3 | 4 | 5 | 6 | 7 | 8 |
|---|---|---|---|---|---|---|---|---|
| 1 | 0.765625 | 0.656250 | 0.546875 | 0.437500 | 0.328125 | 0.218750 | 0.109375 | 0 |
| 2 | 0.656250 | 0.562500 | 0.468750 | 0.375000 | 0.281250 | 0.187500 | 0.093750 | 0 |
| 3 | 0.546875 | 0.468750 | 0.390625 | 0.312500 | 0.234375 | 0.156250 | 0.078125 | 0 |
| 4 | 0.437500 | 0.375000 | 0.312500 | 0.250000 | 0.187500 | 0.125000 | 0.062500 | 0 |
| 5 | 0.328125 | 0.281250 | 0.234375 | 0.187500 | 0.140625 | 0.093750 | 0.046875 | 0 |
| 6 | 0.218750 | 0.187500 | 0.156250 | 0.125000 | 0.093750 | 0.062500 | 0.031250 | 0 |
| 7 | 0.109375 | 0.093750 | 0.078125 | 0.062500 | 0.046875 | 0.031250 | 0.015625 | 0 |
| 8 | 0 | 0 | 0 | 0 | 0 | 0 | 0 | 0 |

TABLE 2

Precomputed Coefficients of Term $\frac{y}{N}\left(1 - \frac{x}{N}\right)$ in an (8×8) Block

| y | x=1 | 2 | 3 | 4 | 5 | 6 | 7 | 8 |
|---|---|---|---|---|---|---|---|---|
| 1 | 0.109375 | 0.093750 | 0.078125 | 0.062500 | 0.046875 | 0.031250 | 0.015625 | 0 |
| 2 | 0.218750 | 0.187500 | 0.156250 | 0.125000 | 0.093750 | 0.062500 | 0.031250 | 0 |
| 3 | 0.328125 | 0.281250 | 0.234375 | 0.187500 | 0.140625 | 0.093750 | 0.046875 | 0 |
| 4 | 0.437500 | 0.375000 | 0.312500 | 0.250000 | 0.187500 | 0.125000 | 0.062500 | 0 |
| 5 | 0.546875 | 0.468750 | 0.390625 | 0.312500 | 0.234375 | 0.156250 | 0.078125 | 0 |
| 6 | 0.656250 | 0.562500 | 0.468750 | 0.375000 | 0.281250 | 0.187500 | 0.093750 | 0 |
| 7 | 0.765625 | 0.656250 | 0.546875 | 0.437500 | 0.328125 | 0.218750 | 0.109375 | 0 |
| 8 | 0.875000 | 0.750000 | 0.625000 | 0.500000 | 0.375000 | 0.250000 | 0.125000 | 0 |

TABLE 3

Precomputed Coefficients of Term $\frac{x}{N}\left(1 - \frac{y}{N}\right)$ in an (8×8) Block

| y | x=1 | 2 | 3 | 4 | 5 | 6 | 7 | 8 |
|---|---|---|---|---|---|---|---|---|
| 1 | 0.109375 | 0.218750 | 0.328125 | 0.437500 | 0.546875 | 0.656250 | 0.765625 | 0.875000 |
| 2 | 0.093750 | 0.187500 | 0.281250 | 0.375000 | 0.468750 | 0.562500 | 0.656250 | 0.750000 |
| 3 | 0.078125 | 0.156250 | 0.234375 | 0.312500 | 0.390625 | 0.468750 | 0.546875 | 0.625000 |
| 4 | 0.062500 | 0.125000 | 0.187500 | 0.250000 | 0.312500 | 0.375000 | 0.437500 | 0.500000 |
| 5 | 0.046875 | 0.093750 | 0.140625 | 0.187500 | 0.234375 | 0.281250 | 0.328125 | 0.375000 |
| 6 | 0.031250 | 0.062500 | 0.093750 | 0.125000 | 0.156250 | 0.187500 | 0.218750 | 0.250000 |
| 7 | 0.015625 | 0.031250 | 0.046875 | 0.062500 | 0.078125 | 0.093750 | 0.109375 | 0.125000 |
| 8 | 0 | 0 | 0 | 0 | 0 | 0 | 0 | 0 |

TABLE 4

Precomputed Coefficients of Term $\frac{x}{N} \cdot \frac{y}{N}$ in an (8 × 8) Block

| y \ x | 1 | 2 | 3 | 4 | 5 | 6 | 7 | 8 |
|---|---|---|---|---|---|---|---|---|
| 1 | 0.015625 | 0.031250 | 0.046875 | 0.062500 | 0.078125 | 0.093750 | 0.109375 | 0.125000 |
| 2 | 0.031250 | 0.062500 | 0.093750 | 0.125000 | 0.156250 | 0.187500 | 0.218750 | 0.250000 |
| 3 | 0.046875 | 0.093750 | 0.140625 | 0.187500 | 0.234375 | 0.281250 | 0.328125 | 0.375000 |
| 4 | 0.062500 | 0.125000 | 0.187500 | 0.250000 | 0.312500 | 0.375000 | 0.437500 | 0.500000 |
| 5 | 0.078125 | 0.156250 | 0.234375 | 0.312500 | 0.390625 | 0.468750 | 0.546875 | 0.625000 |
| 6 | 0.093750 | 0.187500 | 0.281250 | 0.375000 | 0.468750 | 0.562500 | 0.656250 | 0.750000 |
| 7 | 0.109375 | 0.218750 | 0.328125 | 0.437500 | 0.546875 | 0.656250 | 0.765625 | 0.875000 |
| 8 | 0.125000 | 0.250000 | 0.375000 | 0.500000 | 0.625000 | 0.750000 | 0.875000 | 1 |

TABLE 5

Unique Precomputed Coefficients in an (8 × 8) Block

| | | | | |
|---|---|---|---|---|
| 0.015625 | 0.031250 | 0.046875 | 0.062500 | 0.078125 |
| 0.093750 | 0.109375 | 0.125000 | 0.140625 | 0.156250 |
| 0.187500 | 0.218750 | 0.234375 | 0.250000 | 0.281250 |
| 0.312500 | 0.328125 | 0.375000 | 0.390625 | 0.437500 |
| 0.468750 | 0.500000 | 0.546875 | 0.562500 | 0.625000 |
| 0.656250 | 0.750000 | 0.765625 | 0.875000 | 1 |

TABLE 6

SOPOT Coefficients of Precomputed Coefficients in an (8 × 8) Block

| | | | | |
|---|---|---|---|---|
| $2^{-6}$ | $2^{-5}$ | $2^{-5} + 2^{-6}$ | $2^{-4}$ | $2^{-4} + 2^{-6}$ |
| $2^{-4} + 2^{-5}$ | $2^{-3} - 2^{-6}$ | $2^{-3}$ | $2^{-3} + 2^{-6}$ | $2^{-3} + 2^{-5}$ |
| $2^{-3} + 2^{-4}$ | $2^{-2} - 2^{-5}$ | $2^{-2} - 2^{-6}$ | $2^{-2}$ | $2^{-2} + 2^{-5}$ |
| $2^{-2} + 2^{-4}$ | $2^{-2} + 2^{-4} + 2^{-6}$ | $2^{-2} + 2^{-3}$ | $2^{-2} + 2^{-3} + 2^{-6}$ | $2^{-1} - 2^{-4}$ |
| $2^{-1} - 2^{-5}$ | $2^{-1}$ | $2^{-1} + 2^{-5} + 2^{-6}$ | $2^{-1} + 2^{-4}$ | $2^{-1} + 2^{-3}$ |
| $2^{-1} + 2^{-3} + 2^{-5}$ | $2^{-1} + 2^{-2}$ | $2^{-1} + 2^{-2} + 2^{-6}$ | $2^0 - 2^{-3}$ | 1 |

The information on whether a block is smooth and discontinuous can be signaled by a binary bit, which together with the same binary information from other blocks can be coded using context-based arithmetic coding. Each type of block, smooth or continuous, may contain different information to be transmitted to the receiver. They can also be entropy coded in a variety of ways. The essential information to be coded in each type of block is as follows:

Smooth Blocks

For smooth blocks, only the function coefficient $\tilde{f}(N,N)$ located on the right-bottom corner of the blocks needs to be coded. It can be coded using differential PCM (DPCM) method [U.S. Pat. No. 2,605,361 of Cutler, which is incorporated herein by reference in its entirety] with a predictor $\tilde{f}(N,N)$, which is derived from other function coefficients $f(0,0)$, $f(N,0)$, and $f(0,N)$ as follows:

$$\tilde{f}(N,N) = a_0 f(0,0) + a_1 f(N,0) + a_2 f(0,N), \quad (21)$$

where $a_0, a_1$, and $a_2$ are predictor coefficients which can be specified by certain entropy code. The prediction error $\Delta f(N,N) = f(N,N) - \tilde{f}(N,N)$ can be quantized and entropy coded to form $\hat{\Delta}f(N,N)$. The reconstructed value of $\tilde{f}(N,N)$ can be obtained by, $$f(N,N) = \tilde{f}(N,N) + \hat{\Delta}f(N,N). \quad (22)$$

For the entropy code see R. M. Gray, "Source Coding Theory," Kluwer Academic Publishers, (1990), which is incorporated herein by reference in its entirety. However, the value can be coded using various entropy coding method.

For example, prediction error can be coded using modified Huffman code, where the coefficients are divided into categories. The category will be Huffman coded where the value inside will be coded using weighted binary representation. Prediction of the categories can also be performed and the difference in categories can be coded using arithmetic coding. For information on Huffman codes see Steven Pigeon, "Huffman Coding". [ONLINE] Available: http://www.stevenpigeon.com/Publications/publications/HuffmanChapter.pdf, which is incorporated herein by reference in its entirety.

If the prediction is effective, then the prediction error may be zero after quantization. Not all smooth blocks inside a coding unit (CU) will contain data for $\Delta f(N,N)$. Several blocks can be grouped in a larger CU and coded together to improve coding efficiency. For example, the information to indicate whether a block has a prediction error inside a CU can be predicted using context-based arithmetic coding to improve coding efficiency. Similar techniques can be applied to other forms of information, such as whether a block inside a CU is smooth or discontinuous.

If all the blocks are smooth with $\Delta f(N,N)$, i.e., all zeros, and there are no further residuals to be coded, then the blocks can be skipped. This can be indicated by a skip mode information bit and coded using context-based arithmetic coding or run-length coding by specifying the address increment of the CU as in conventional video coders.

Discontinuous Blocks

For discontinuous blocks, information such as the locations of the feature points of the line segments, and bilinear function coefficients of the resulting partitions are coded.

Coding of Lines

For each block, lines extending from previously coded neighboring blocks on the top-left, top and left of the current block will be coded first. Since the discontinuities are represented by line segments, the lines may contain one or more segments inside a block. To specify the segments inside a block, the numbers of segments inside the block as well as the locations of the turning points inside the block together with their end points on the boundary have to be coded.

New lines can also occur inside a block and they will be coded again by specifying the end points, turning points and number of segments.

To signal the number segments in a given line inside a block, each line is given a LINE_TYPE. A possible definition of LINE_TYPE is as follows:

LINE_TYPE 0: straight line (one segment);

LINE_TYPE 1: one turning point (two segments);

LINE_TYPE 2: two turning points (three segments);

LINE_TYPE 3: three turning points (four segments);

LINE_TYPE 4: lines with more than three turning points;

LINE_TYPE 5: lines with free starting points;

LINE_TYPE 6: closed polygonal with at least three points;

LINE_TYPE 7: the line has been terminated;

LINE_TYPE 8: matte.

LINE_TYPEs 0 to 4 are designed to code extended lines from neighboring blocks and new lines that originate from block boundaries. LINE_TYPEs 4 is an escape code which allows coding a variable number of turning points greater than three.

LINE_TYPES 5 and 6 are designed to code new line segments that originate from the current block, which have free starting points. LINE_TYPE 6 further allows the line segments to form a closed polygonal. LINE_TYPE 7 handles the case where an extending line may end at the boundary. LINE_TYPE 8 allows general discontinuity patterns in term of a binary matte image to be specified.

The LINE_TYPE can be entropy coded. Moreover, appropriate prediction of LINE_TYPE can be performed from previous extended lines. This will greatly improve the coding efficiency when a long straight line segment spans through many coding blocks or units. In this case, the LINE_TYPE (which is 0) can be predicted well and can be compressed efficiently using context-based arithmetic coding.

Once the LINE_TYPE is decoded, the necessary information associated with each of these cases can be defined in a certain format. This allows the information to be recovered at the decoder for reconstruction.

Coding of New Lines

In encoding, the encoder has the right to determine which lines are important for coding to limit the bit rate using the depth-aware approach, with discontinuities at larger depth being considered less important. If there are new lines, this can be indicated by the flag NEW_LINE. These bits for all blocks inside a CU can be grouped together and be coded by arithmetic coding.

The number of new lines is signaled by NUM_LINES in the data of each block. Other information needed includes i) LINE_TYPEs, ii) locations of starting and end points, and iii) locations of any turning points. The NUM_LINES and LINE_TYPE can be jointly coded using Huffman code before arithmetic coding. Different Huffman tables can also be used to adapt to the number of lines and types supported as shown in the following tables.

TABLE 7

Example code for coding number of lines and line type in a discontinuous block with limited line number and types.

| NUM_LINES | LINE_TYPE | CODE |
|---|---|---|
| 1 | 0 | 0 |
| 1 | 1 | 10 |
| 2 | 0, 0 | 110 |
| 2 | 0, 1 | 1110 |
| 2 | 1, 1 | 1111 |

TABLE 8

Code for coding number of lines and line type in a discontinuous block with more number of line number and types.

| LAST_LINES | LINE_TYPE | CODE |
|---|---|---|
| 0 | 0 | 101 |
| 0 | 1 | 1101 |
| 0 | 2 | 11100 |
| 0 | 3 | 11110 |
| 0 | 4 | 111111 |
| 1 | 0 | 0 |
| 1 | 1 | 100 |
| 1 | 2 | 1100 |
| 1 | 3 | 11101 |
| 1 | 4 | 111110 |

The first table supports up to two new lines and two types for small block size, while the other table, which is designed for larger and more complicated blocks, supports up to four types and specifies the lines one by one through the indicator LAST_LINES. In (16×16) blocks, if LAST_LINES=1, the current line is the last line to be coded in the block. The encoder can select one of the two coding tables above. Variations of these schemes exist.

Coding of Starting, Turning and End Points

For non-terminated extended lines from adjacent coded blocks, the starting point need not be coded. When the LINE_TYPE is 0, the line to be coded is a straight line, and it is completely defined inside as the block. Its information can be inferred from the neighboring block and hence its end point does not need to be coded.

Figure 6A:
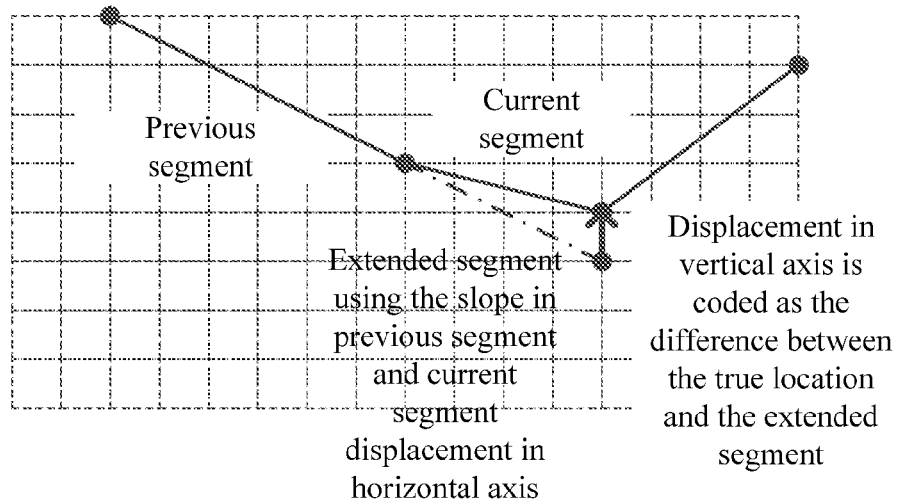
FIG. 6(a) illustrates the coding of turning points and FIG. 6(b) shows the coding of end points.

Each turning point is coded with respect to the previous reference point, which can be a previous turning point or point on the block boundary. The change in the horizontal and vertical coordinate inside the block with respect to the reference point is coded. Common methods for coding these values include differential PCM where the first coordinate value is coded and the difference between the two coordinate is also coded. Another method is to code the largest displacement among the horizontal or vertical displacements with respect to its reference point. To specify the other coordinate, the direction of the line can be coded instead. To this end, its intersection point on the boundary can be specified by coding the clockwise or counter-clockwise displacement along the block boundary in order to indicate the linear extended end point of the line just before its end at the reference would reach the actual boundary intersecting point as shown in FIG. 6(a).

For new lines that originate from the boundary, the starting points have to be coded. The boundary (left, top, right, bottom) as well as the coordinate of the starting point on the boundary need to be specified. The turning points, if any, are coded as in the previous case.

Figure 6B:
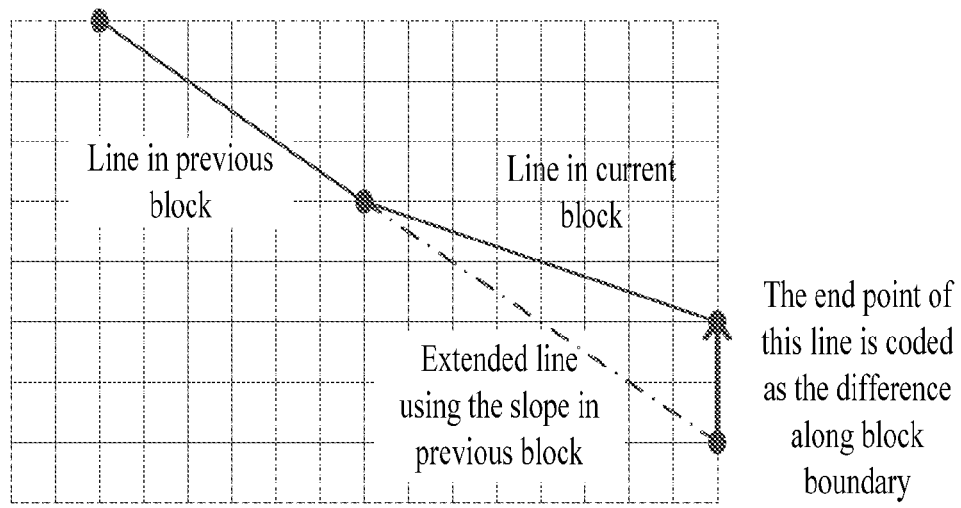

If a line segment has its end point lying on one of the four block boundaries, it is called a normal end point and it is coded through the clockwise or counter-clockwise displacement along the block boundary in order for the linear extended end point from the previous line (just before the last line segment) in order to reach the actual boundary intersecting point as shown in FIG. 6(b).

If the first turning point of an extended line has the maximum coordinate value equal to zero, then this block boundary point is also one of the turning point(s). If the last turning point of an extended line has the maximum coordinate value equal to zero, then it is assumed that the line has been terminated due to an intersection with another line segment.

For new line segments which form a closed polygonal or segments with two free starting and end points inside the block, LINE_TYPE 6 and 5 can be used respectively. The reference point for coding the starting point can be chosen as an appropriate point such as the origin of the block. The coding of the turning point is similar, except that the end point will not be coded as if they are normal end points which lie on the block boundaries. For the closed polygonal, the end point by default is also the starting point.

Coding of Bilinear Function Coefficients

In practice, the four corners of the bounding box for IIP may or may not coincide with the pixels inside the partition. For the latter, they are referred to as the "virtual corners" while the former are referred to as "pixel corners". If there is only one line passing through a pixel corner, then it is called a simple pixel corner. Because of this property, pixels around this simple pixel corner can be divided according to this line into two halves, one associated with the partition and the other outside the partition.

The coding of the function coefficients of the bilinear function can be divided, according to the types of the corners of the bounding box, into the following cases:

1. No pixel corners and they do not lie on coded boundaries. In this case, the four corner values are virtual corners and we have an isolated bounding box. As accurate prediction of their values is rather difficult, they are transformed by a (2×2) DCT, quantized and entropy coded.
2. No pixel corners and at least one of them lie on coded adjacent boundaries. In this case, they are transformed by a (2×2) DCT, quantized and entropy coded. The average of the depth values on the adjacent coded boundaries next to the pixels of the partition is used to as the predictor for the DC value.
3. Simple pixel corners lying on a coded adjacent boundary. In this case, the depth values at the simple pixel corners can be estimated from previously coded adjacent pixels. Therefore, the number of parameters in the bilinear function to be estimated and coded will be reduced.

In case 3, previous coded adjacent pixels may not provide good estimations of the required bilinear coefficients due to outliers or other problems. Then the coefficients may be coded using cases 1 and 2. Variations of the above schemes through different prediction of the bilinear function coefficients are also possible.

Depth-Aware Adaptive Companding Quantization

Depth values with different magnitudes are of different importance. Small depth values which lead to very small disparity or displacement of the corresponding color images during view synthesis or rendering generally can be given larger quantization error. Moreover, for a depth map with large bit width such as 12 bits or 16 bits, non-uniform quantization is desirable to improve compression efficiency.

Companding is a classical technique for representing signal with large dynamic range with limited number of bits per sample. See, H. Kaneko, "A Unified Formulation of Segment Companding Laws and Synthesis of Codecs and Digital Compandors," *Bell System Technical Journal*, vol. 49, pp. 1555-1558, (September 1970), which is incorporated herein by reference in its entirety. Companding is achieved by quantizing the input signal to discrete levels having separation increasing with the signal magnitude. A simple method to realize such a non-uniform quantizer is to transform the input x to y=$f$(x) where $f$(x) is a function that gradually levels off to reduce the dynamic range of x. Then, uniform quantization is performed on y. Thus, the equivalent quantizer levels in x have increasing separation as x increases. This is illustrated in FIG. 7.

Figure 7:
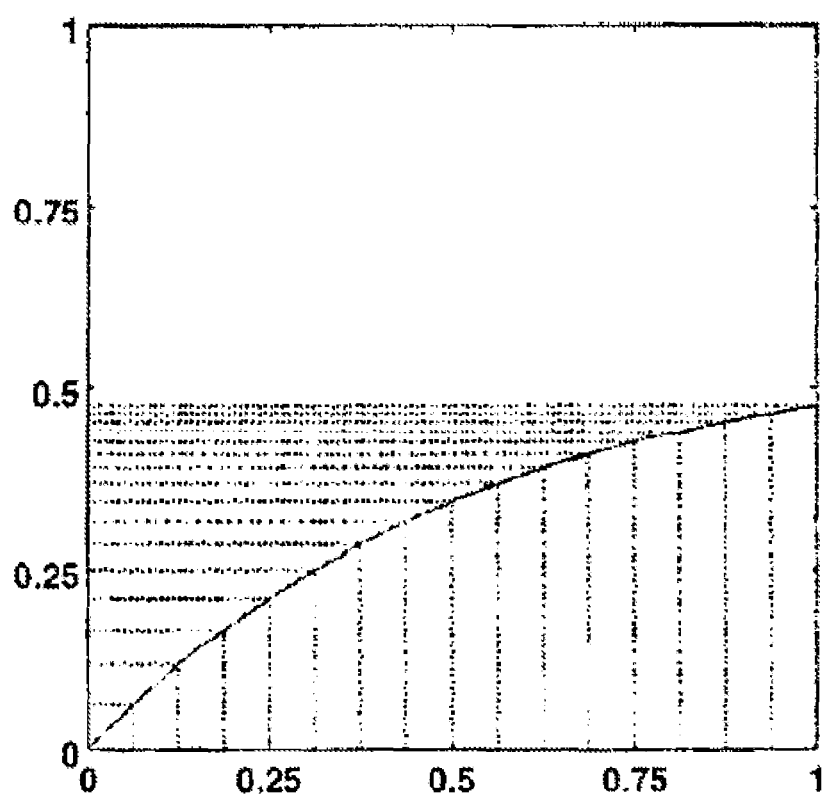
FIG. 7. shows the companding function of equation (23)

FIG. 7 shows the companding function of equation (23) $a_k = \alpha^k$ with $$\alpha = \frac{8}{9}.$$

The companded values are uniformly quantized (approximated by equally spaced discrete values), which correspond to a non-uniform quantization at the input (approximated by unequally spaced discrete values.) Companding is frequently used in speech and audio signals and two commonly used companding standards are the u-law and the A-law as disclosed in the Kaneko article. The purpose is to reduce the quantization error at small signal magnitude (level) and increase the quantization error at large signal levels. This roughly achieves a constant signal to quantization noise ratio over the signal range given the limited number of discrete-levels, and hence the number of bits per sample.

In depth coding, companding can be used to improve coding efficiency by putting more quantization error at large depth values for bit rate control especially for depth maps with large bit widths. However, direct application of conventional companding techniques to the input is undesirable as i) the input may have different bit widths, say 8, 12 or 16 bits, and a single function cannot works for all these cases, ii) it is a lossy process and hence significant distortion will be experienced even without any further coding, and iii) the characteristics of depth maps are different from other signals.

Instead, the present invention presents a new adaptive quantization method which involves variable companding functions, called adaptive companding quantization (ACQ). The companding is only used during quantization and hence there is no loss in input accuracy in subsequent operations.

In conventional companding techniques, y=$f$(x) is quantized by a certain uniform quantizer Q into say a b-bit number $\hat{y}$=Q[$f$(x)]. If the input is converted to this format first before processing, then the storage can be reduced but distortion will immediately be introduced in subsequent operations. If $f$(x) is made adaptive, then all the input samples have to be transformed and quantized using the variable companding functions, which poses challenge for real-time implementation.

In the proposed ACQ, the operation is only performed on the bilinear and other coefficients to be quantized, which greatly reduces the arithmetic complexity and there is no loss in accuracy in the input and subsequent operations.

Variable Companding Functions

Assume the input x is considered as a number in [0,1]. Unlike conventional techniques, which increase the quantization levels at small depth values, the proposed variable companding function gradually decreases the separation between the discrete reconstruction levels as the depth value increases.

For implementation simplicity, a piecewise linear approximation is used, though it can be generalized to more complicated functions such as piecewise quadratic function, etc. The input interval is divided into M intervals, and the length of the k-th interval is $L_k$, k=0, ..., M−1. Inside each interval, the companding function is given by $$f_k(x) = a_k(x - l_k) + f_{k-1}(l_k) = a_k x + \beta_k \tag{23}$$

where $l_k=\Sigma_{j=0}^{k-1}L_j$, $a_k$ and $f_{k-1}(l_k)$ are respectively the starting location, slope and intercept of the straight line approximation of interval k and $\beta_k=f_{k-1}(l_k)-a_kl_k$. Both $a_k$ and $\beta_k$ can be precomputed and stored as SOPOT coefficients so that the above process can be implemented using additions and shifts only. The quantization is performed by dividing the companded value $f(x)$ by quantizer step size value q and rounding to an integer:

$$\hat{y}_q = \text{round}\left(\frac{f(x)}{q}\right).$$

For inverse companding-quantization, $\hat{y}_q$ will be multiplied by q to obtain $q\hat{y}_q$. To compute the inverse, $q\hat{y}_q$ is compared with $f_{k-1}(l_k)$, which can be pre-stored, to determine which interval k it belongs too. If $M=2^m$, this can be efficiently performed by hierarchical search, when $q\hat{y}_q$ is compared with the $f_{M/2-1}(l_{M/2})$ to see whether it is on the left or right half of the input interval [0,1]. This process can be repeated in the selected interval by comparing the intercept of the middle interval to see whether it is on the left or right side of that interval. The final interval can be determined in m steps. Once the desired interval is determined, the quantized input $\hat{x}$ can be recovered by taking the inverse of $f(x)$ as $$\hat{x} = \frac{1}{a_k}[q\hat{y}_q - f_{k-1}(l_k)] + l_k. \tag{24}$$

The value of $1/a_k$ can again be solved as SOPOT coefficients so that the division can be implemented using shifts and multiplications only. The values of $f_{k-1}(l_k)$ and $l_k$ can be precomputed and stored in a table.

Consider now two examples as follow:

EXAMPLE 1

Let $M=2^m$ for some positive integers m with $L_k=1/M$, i.e. same interval length. Typical values of M are 2, 4, 8, 16, etc. The determination of which interval x belongs to can be checked easily from the m leading bits of the binary representation of x. For example, if $M=4$, the two most significant bits are sufficient. The companding function inside the k-th internal k=0, . . . , M−1 is given by $$f_k(x) = a_k\left(x - \frac{k}{M}\right) + f_{k-1}\left(\frac{k}{M}\right) = a_kx + \beta_k, \tag{25}$$

$$k = 0, \ldots, M-1.$$

where $\beta_k = f_{k-1}\left(\frac{k}{M}\right) - \frac{k}{M}a_k.$

Furthermore, if $a_k=\alpha^k$, then $$\beta_k = \frac{1 - 2\alpha^k + \alpha^{k+1}}{M(1-\alpha)}.$$

Both $\alpha^k$ and $\beta_k$ can be precomputed and stored as SOPOT coefficients. Typical values of $\alpha$ can be chosen as $$\alpha = \frac{2^p}{2^p + h},$$

where h is an positive integer less than $2^p$. The advantage of these choices is that the division $$\frac{1}{a_k}$$

required in (24) can be implemented as the multiplication $$\alpha^{-k} = \left(\frac{2^p + h}{2^p}\right)^k = (1 + 2^{-p}h)^k.$$

This can be written as an exact SOPOT coefficient without any integer division, which simplifies considerably the implementation at the decoder.

EXAMPLE 2

If we implement $\log_2(x)$, then the piecewise approximation will have the length of the k-th interval $l_k$ being $$L_k = \frac{2^k}{2^M},$$

k=0, . . . , M−1, except for the last one which will only have length $$L_{M-1} = \frac{1}{2^M}.$$

Then, $$f_k(x) = \left(\frac{1}{2}\right)^k\left(x - \frac{2^k - 1}{2^M}\right) + k.$$

In coding the prediction residuals, we are given an input sample x to be predicted from a quantized value of a predictor $x_p$. The companded value of x is $y=f(x)$ and in general is this a real-value number. Let the quantized predictor of $x_p$ be $q\hat{y}_q$, then the prediction residual in the companded domain is $$e=y-q\hat{y}_q \tag{26}$$

Its quantized value with a quantizer step size q' is then given by $e_{q'}=\text{round}(e_q/q')$. During dequantization, we first recover $$\hat{e}_{q'}=e_{q'}q'. \tag{27}$$

Then it is added back to the predictor to form $$\hat{y}=q\hat{y}_q+\hat{e}_{q'} \tag{28}$$

Then the original domain quantized value is given by $\hat{x}=f^{-1}(\hat{y})$.

When coding the four bilinear function using (2×2) DCT, the four coefficients can be companded before taking the transformation. This will reduce the dynamic range of high frequency DCT coefficients and lead to higher compression ratios, especially for blocks or partitions with large depth values. This also applies when higher order DCT such as (8×8), etc., is applied to code a depth map directly. The DCT coefficients can be quantized and entropy coded.

After reconstruction using inverse DCT, inverse companding has to be performed on the reconstructed coefficients. At very high compression ratio, background depth pixels with large depth values will be subject to severe quantization due to companding. This may lead to contouring artifacts. To suppress these artifacts, filtering along block boundaries can be performed. Since the partition information is available, efficient filtering can be performed in pixels at similar and neighbouring partitions inside an appropriate window around the boundary pixels as follows $$d_s(x, y) = \frac{1}{S} \sum_{(x_i, y_i) \in W(x,y)} w_i s_i(x, y) d(x_i, y_i), \quad (29)$$

$$\text{where } S = \sum_{(x_i, y_i) \in W(x,y)} w_i s_i(x, y),$$

$w_i$ is a weighting function which depends on the distance between $(x_i, y_i)$ and $(x,y)$, $W(x,y)$ is an appropriate window centered around the block boundary pixel at $(x,y)$ for smoothing. $s_i(x,y)$ is the similarity between the depth value at $(x_i, y_i)$ and $(x,y)$. In the simplest case, $s_i(x,y)$ can be chosen as 1 for all pixels $(x_i, y_i)$ in the same partition as $(x,y)$ and the partition in the neighboring block which is closest to $(x_i, y_i)$. This avoids over-smoothing of the depth discontinuities. Other criteria can also be devised. To simplify implementation, the weighting coefficients may be fixed for a given nonzero pattern of $s_i(x,y)$. Thus the normalization can be precomputed and be merged with $w_i$. The resulting weighting coefficients can be simplified to SOPOT coefficients so that the filtering can be done by additions and shifts only.

Adaptive De-Blocking

Figure 8:
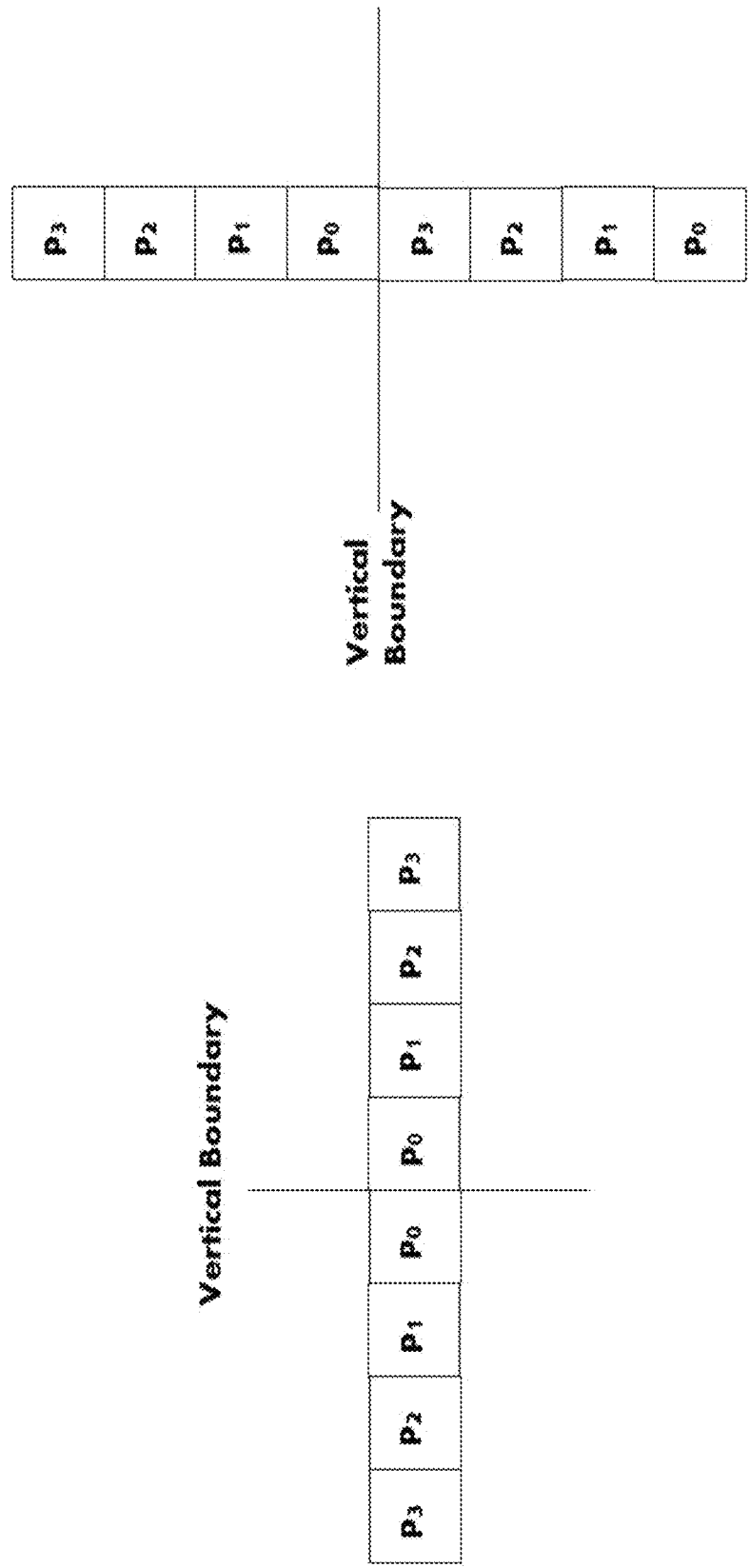
FIG. 8 shows the de-blocking samples for vertical and horizontal boundaries.

Various types of one dimension filters and filtering decision are designed to perform the de-blocking filter for adaptive de-blocking. The choice of de-blocking parameters, such as filter window size $W(x,y)$, and weighting coefficients $w_i$, can be adjusted by the boundary strength (BS) which derives from the difference of samples across the boundary as shown in FIG. 8. The filtering operation will be performed on the vertical boundaries and horizontal boundaries, respectively.

One problem of conventional de-blocking filters is that the discontinuities located on or near the boundaries may be over-smoothing during the de-blocking process. Due to the use of DDR, the proposed de-blocking filter can preserve the discontinuities well by the depth similarity parameters $s_i(x, y)$. If the current de-blocking sample and its neighboring samples in the filtering window are in the same partition, the $s_i(x,y)$ is chosen as 1. Otherwise, $s_i(x,y)$ is chosen as 0. For example, the similarity parameter of the current de-blocking sample, which is signed as $s_0$ as shown in FIG. 9. In FIG. 9(a), the current de-blocking sample and its neighboring samples are in the same partition, so the all similarity parameter $s_i(x,y)$ is chosen as 1. In FIG. 9(b), the current de-blocking sample and its neighboring samples are in different partitions, so $s_0=1$, $s_1=1$, and $s_2=0$ for the left filter when $s_0=1$, $s_1=0$, $s_2=1$, $s_3=0$, and $s_4=1$.

The BS is depending upon compression mode, quantization parameter, and the depth values. For efficient implementation, the BS is chosen according to the following rules:

| | |
|---|---|
| If $\|p_0 - p_1\| > T_2$ | BS = 3 |
| If $T_2 \geq \|p_0 - p_1\| > T_1$ | BS = 2 |
| If $T_1 \geq \|p_0 - p_1\| > T_0$ | BS = 1 |
| If $\|p_0 - p_1\| \leq T_0$ | BS = 0 |

The thresholds $T_0$, $T_1$, and $T_2$ are adopted to the above depth-aware adaptive companding quantization of the two neighboring blocks located at the both sides of the boundaries. Once boundary strength is determined, the BS can be used to determine the de-blocking parameters as follows:

| | |
|---|---|
| If BS = 3 | $W(x, y) = 3$, and weighting coefficients of 3 taps filter is chosen as [1, 1, 1] |
| If BS = 2 | $W(x, y) = 3$, and weighting coefficients of 3 taps filter is chosen as [1, 2, 1] |
| If BS = 1 | $W(x, y) = 5$, and weighting coefficients of 5 taps filter is chosen as [1, 2, 3, 2, 1] |
| If BS = 0 | No Filtering |

This also works for inter coding of the depth map using block-based motion estimation as long as one can detect the discontinuity on the both sides of the boundary using a unique method that can be performed also at the decoder without ambiguity.

A Scale Adaptive Block Size

The block size N×N of the codec impacts the compression performance, such as compression quality and bit rate. Usually the use of large block size allows the codec to improve the coding efficiency by exploring the spatial redundancy for high resolution depth images. In DCT-based intra coding methods, the block size should be fixed because the DCT transform must be performed by a fixed size, such as (8×8) or (32×32). The proposed intra coding uses the bilinear function to locally approximate the depth maps, and so the block size of the proposed intra coding can be arbitrary. Thus, a scale adaptive block size can be used to adapt to different image resolution and the bit rate requirement. For example, we can increase the block size to achieve a lower bit rate or when the image resolution is large.

A Resolution Decimation Scheme

Another effective scheme which can be used to achieve a lower bit rate is to decimate the resolution of input depth video before encoding by the proposed codec. Due to the efficiency of DDR representation, the discontinuities information can be gracefully preserved during the decimation and intra coding process. Usually the maximum edge approximation errors will be increased by a factor of two if the horizontal or vertical resolution is reduced by half, and vice versa. Another advantage of the proposed intra codec using the decimation scheme is that the decimated depth maps can be easily upscaled or interpolated to higher resolutions with high quality by interpolating the lines in the DDR and the smooth areas using the multiplier-less bilinear interpolation method. The proposed multiplier-less bilinear interpolation also form an efficient method for depth and other videos upscaling. Possible decimation patterns include: horizontal decimation by 2, horizontal and vertical decimation by 2, horizontal decimation by 4 and vertical decimation by 2, and vice versa.

The use of depth-aware adaptive quantization/depth detection scheme, scale adaptive block size, and a resolution-adaptive decimation scheme provide efficient mechanism for controlling the bit rate of the codec.

Residual Quantization

For smooth blocks, the residuals (errors) after approximation by the bilinear function are usually smooth. On the other hand, large residuals are usually found around depth discontinuities. The residuals are first companded before further coding.

A classical method for coding these types of residuals is to employ transform coding using the DCT. However, as the residuals for discontinuous blocks are usually clustered around the depth discontinuities, the DCT expansion will usually generate many nonzero frequency coefficients which require many bits to specify their locations as well as magnitude. In order to solve this additional modes are provided to encode these residuals. Four possible modes are:
  i) DDR-based residual coding,
  ii) Quad-tree or context-based arithmetic coding-based residual coding,
  iii) Chain-coded based coding, and
  iv) Hierarchical bilinear refinement of smooth blocks.

In DDR-based residual coding, there are two approaches to encode the residuals. For one approach, the residual pixels around a certain distance from the coded depth discontinuities are scanned in a certain predefined order. Then the quantized residuals are entropy coded. If connected neighbours with similar distances from the discontinuities are chosen, then the amplitudes of the residuals are similar to each other. Consequently, their values can be DPCM coded using adaptive companding quantization described above. For another approach, the residual pixels around a certain distance from the coded depth discontinuities are clustered into several groups using the Euclidean Distance between the amplitudes of the residual pixels and some reference values, which can be represented by the mean depth values of different depth regions around the coded depth discontinuities. Then, the amplitudes of the residual pixels can be predicted by these reference values and coded using adaptive companding quantization described above. The indicates of the groups of the residual pixels can be coded by arithmetic coding.

In Quad-tree-based residual coding, a block with nonzero quantized residuals is partitioned into (2×2) non-overlapping sub-blocks with the same size. Sub-blocks with non-zero quantized residuals will be further divided until a preset sub-block size, say (4×4) or (2×3), is reached. The case whether a given sub-block has zero or nonzero quantized residuals is indicated by a binary bit QR (QR=0 means no quantized residuals and QR=1 means there are quantized residuals and the sub-block will be split). The collection of these bits defines a quad-tree data structure representing the nonzero (4×4) sub-blocks containing nonzero quantized residuals. See, R. Finkel, et al., "Quad Trees: A Data Structure for Retrieval on Composite Keys," *Acta. Informatica*. vol. 4, no. 1, pp. 1-9, (1974), doi:10.1007/BF00288933, which is incorporated herein by reference in its entirety. There are many methods to code the (4×4) residuals. One simple method is to scan neighbouring residuals in a row-by-row or column-by-column or other predefined manner. Since the residuals are neighbours, their amplitudes are likely to be similar and DPCM or other methods exploring this correlation can be used. Furthermore, the residuals will be companded to take into account the different importance of the depth values.

Instead of the Quad-tree method, the nonzero quantized coefficients inside a block can be specified using context-based arithmetic coding in which the block is divided into non-overlapping sub-blocks with the small block size, say (4×4). If there are any nonzero quantized coefficients in each sub-block, the sub-block pattern bit for this block is set to 1 and 0 otherwise. The (4×4) sub-block pattern bits are coded using context-based arithmetic coding as if they were binary images. The (4×4) sub-blocks with nonzero residuals can be coded as mentioned before.

In the chain code-based method, the locations of a series of smallest sized sub-blocks, say (4×4), with nonzero quantized residuals is specified. The relative locations of the (4×4) sub-blocks in the sequence are coded by chain code. This method is efficient for coding isolated nonzero quantized residuals.

The DDR-based coding can be performed followed by the Quad-tree or context-based arithmetic coding method or the chain code-based method. Alternatively, they can be used separately. DDR-based coding is used primarily in discontinuous blocks, while the latter applies to both smooth and discontinuous blocks.

The hierarchical bilinear refinement method is intended for reducing the fitting errors in smooth blocks by introducing additional bilinear coefficients inside the block.

For a smooth block, all the depth values d(x,y) inside the block are approximated by a bilinear function. The bilinear approximation is performed in a rectangular integer grid $(x,y)\epsilon[0,N]\times[0,N]$.

Let the current block to be refined be located in the integer grid $(x,y)\epsilon[1,N]\times[1,N]$ where x and y are respectively the horizontal and vertical coordinates and N×N is the block size. Let the resultant fitting error be e(x,y). Then the bilinear function may be used to approximate it with a smaller block size of $$\frac{N}{2} \times \frac{N}{2}.$$

The process is similar to the original fit except that the block size is now halved and the residual is fitted. This process can be repeated to further refine the residuals.

Hierarchical method can be combined with the quad-tree or context-based arithmetic coding method to refine major residuals in a block.

While the invention has been particularly shown and described with reference to preferred embodiments thereof, it will be understood by those skilled in the art that various changes in form and details may be made therein without departing from the spirit and scope of the invention. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

Abnormal Values Smoothing

To remove the abnormal values around the discontinuities of the decoded depth maps, abnormal values smoothing is proposed. A set of one-side filters with various window sizes and various filtering weights is used to filter the abnormal values around the discontinuities of the decoded depth maps. The choice of filter window size $W_m$ (x,y), and weighting coefficients $\varphi_i$, can be adjusted by our proposed variance estimator or pre-defined by the users.

The operation of the abnormal values smoothing consists of two steps: 1) a variance estimator is used to estimate the variance, v, of the depth values of each side of the discontinuities. 2) window size and weighting coefficients of the one-side filters can be chosen by the variance of the depth values at each side. The following table gives an example of the choice of the window size and weighting coefficients of the one side smoother.

| | |
|---|---|
| $v \in (0, 5)$ | $W_m(x, y) = 3$, and weighting coefficients of 3 taps filter is chosen as [3, 2, 1] |
| $v \in (5, 10)$ | $W_m(x, y) = 3$, and weighting coefficients of 3 taps filter is chosen as [1, 1, 1] |
| $v > 10$ | $W_m(x, y) = 3$, and weighting coefficients of 5 taps filter is chosen as [1, 1, 1, 1, 1] |
| $v = 0$ | No Filtering |

What is claimed:

1. A method for encoding depth map image, comprising the steps of:
   dividing the depth map image into blocks;
   classifying the blocks into smooth blocks without large depth discontinuities and discontinuous blocks with large depth discontinuities;
   representing, in the discontinuous blocks, the depth discontinuities by line segments and partitions; and
   using interpolation-based intra prediction to approximate and compress depth values in the smooth blocks and the partitions further comprising the steps of tracing depth discontinuities in the discontinuous blocks; and classifying the discontinuous blocks into incomplete discontinuities where the depth discontinuities disappear inside the discontinuous blocks.

2. The method of claim 1 wherein the partitions are determined based on the function coefficients of a bilinear function.

3. The method of claim 1 further comprising the step of applying one or more of depth-aware quantization, adaptive de-blocking filtering, a scale adaptive block size, and a resolution decimation scheme for adapting to different input image resolution and bit rates.

4. A method for a decoding depth map image that has been encoded according to claim 2, comprising the step of using a multiplier-less realization of the bilinear function to reconstruct the smooth blocks and partitions.

5. The method of claim 1, wherein the blocks are in different sizes.

6. The method of claim 2, wherein the depth values in the partitions are determined based on the functional coefficients.

7. The method of claim 1 further comprising a step of extending the depth discontinuities to boundaries or to cross other depth discontinuities of the discontinuous blocks.

8. The method of claim 7, wherein the depth discontinuities are extended to cross other depth discontinuities.

9. The method of claim 8 further comprising a step of approximating the line segments to binary line segments of the extended depth discontinuities inside the discontinuous blocks.

* * * * *